United States Patent
Miyamoto et al.

(10) Patent No.: US 7,804,665 B2
(45) Date of Patent: Sep. 28, 2010

(54) HEAD SUPPORT DEVICE, DISK DEVICE HAVING THE HEAD SUPPORT DEVICE, AND PORTABLE ELECTRONIC DEVICE HAVING THE DISK DEVICE

(75) Inventors: Makoto Miyamoto, Hyogo (JP); Hideki Kuwajima, Kyoto (JP); Yoshihiro Ueno, Osaka (JP); Hideyuki Hashi, Osaka (JP)

(73) Assignee: Panasonic Corporation, Osaka (JP)

( * ) Notice: Subject to any disclaimer, the term of this patent is extended or adjusted under 35 U.S.C. 154(b) by 663 days.

(21) Appl. No.: 11/794,681

(22) PCT Filed: Dec. 27, 2005

(86) PCT No.: PCT/JP2005/023876

§ 371 (c)(1),
(2), (4) Date: Jul. 3, 2007

(87) PCT Pub. No.: WO2006/073086

PCT Pub. Date: Jul. 13, 2006

(65) Prior Publication Data

US 2009/0207526 A1    Aug. 20, 2009

(30) Foreign Application Priority Data

Jan. 5, 2005    (JP) ............................. 2005-000397

(51) Int. Cl.
*G11B 5/60* (2006.01)
(52) U.S. Cl. .................................. 360/294.7
(58) Field of Classification Search ........................ None
See application file for complete search history.

(56) References Cited

U.S. PATENT DOCUMENTS

| 5,745,319 | A | 4/1998 | Takekado et al. |
| 5,754,368 | A | 5/1998 | Shiraishi et al. |
| 6,751,064 | B2 | 6/2004 | Kuwajima et al. |
| 6,859,344 | B2* | 2/2005 | Kawauchi et al. ........ 360/234.3 |
| 7,095,593 | B2* | 8/2006 | Ueno et al. .................. 360/244 |
| 7,119,992 | B2* | 10/2006 | Miyamoto et al. ........ 360/256.4 |
| 2004/0070867 | A1 | 4/2004 | Kudo et al. |
| 2004/0090711 | A1 | 5/2004 | Kuwajima et al. |
| 2004/0130824 | A1 | 7/2004 | Ueno et al. |
| 2004/0184193 | A1 | 9/2004 | Honda et al. |
| 2005/0057857 | A1* | 3/2005 | Kawakami et al. ........ 360/256.4 |

FOREIGN PATENT DOCUMENTS

| JP | 6-259905 | 9/1994 |
| JP | 2894262 | 3/1999 |
| JP | 2002-237160 | 8/2002 |
| JP | 2003-069671 | 3/2003 |

(Continued)

*Primary Examiner*—Mark Blouin
(74) *Attorney, Agent, or Firm*—Wenderoth, Lind & Ponack, L.L.P.

(57) ABSTRACT

A head support device that is resistant to shock due to external impact, a disk device including the head support device, and a portable electronic device including the disk device are disclosed. In the head support device, a head support arm on which a head slider with a head is disposed through a flexible and elastic gimbal mechanism is formed rotatably about a rotary shaft as a horizontal rotating axis in parallel with a disk surface. The head support arm is formed such that it pivots, about a straight line drawn between apexes of a pair of pivots as a vertical pivot axis, vertically (generally perpendicularly) with respect to the disk surface. A gravity center position of a total mass of members, other than the head slider, pivoting about the vertical pivot axis is positioned near the vertical pivot axis.

8 Claims, 12 Drawing Sheets

FOREIGN PATENT DOCUMENTS

| JP | 2004-030856 | 1/2004 |
|----|-------------|--------|
| JP | 2004-62936  | 2/2004 |
| JP | 2004-071089 | 3/2004 |
| JP | 2004-087101 | 3/2004 |
| JP | 2004-134036 | 4/2004 |
| JP | 2004-139717 | 5/2004 |

* cited by examiner

US 7,804,665 B2

HEAD SUPPORT DEVICE, DISK DEVICE HAVING THE HEAD SUPPORT DEVICE, AND PORTABLE ELECTRONIC DEVICE HAVING THE DISK DEVICE

This application is a U.S. national phase application of PCT international application PCT/JP2005/023876, filed Dec. 27, 2005.

BACKGROUND OF THE INVENTION

1. Technical Field

The present invention relates to a head support device to be used in a disk device having a floating-type head, such as a magnetic disk drive, an optical disk drive, or a magneto optical disk drive. The present invention also relates to a disk device having the head support device, and a portable electronic device using the head support device.

2. Background Art

A conventional head support device having a floating-type head of a disk device is described with reference to the accompanying drawings, and a magnetic disk device such as a hard disk device is taken as an example. In FIG. 16, head support device 161 includes suspension 162 having relatively low rigidity, leaf spring 163, and support arm 164 having relatively high rigidity. Suspension 162 has head slider 165 to which a magnetic head (not shown) is mounted on an underside of an end of suspension 162.

Magnetic disk 166 is spun by spindle motor 167. When the disk device reads or writes data, head slider 165 floats above magnetic disk 166 by a predetermined height in response to a balance between floating force and urging force. The floating force is given to head slider 165 due to airflow produced by a spin of disk 166, and the urging force produced by leaf spring 163 of head support device 161 urges head slider toward disk 166. In other words, the magnetic head mounted to head slider 165 floats above disk 166 by the predetermined height.

In reading or writing the data, head support device 161 rotates about bearing 169 due to the activation of voice coil 168 provided to support arm 164. The magnetic head mounted to slider 165 is positioned at a desired track of disk 166 in order to read or write data.

A structure and operation of head support device 161 are described with reference to FIG. 17, which shows a perspective view of an essential part where the magnetic head is mounted to head support device 161. In FIG. 17, the magnetic head (not shown) is provided to head slider 165 placed on the underside of a first end of suspension 162 such that the head confronts magnetic disk 166 (not shown in FIG. 17). A second end of suspension 162 is bent to form leaf spring 163, which is fixed to support arm 164. Leaf spring has cutout section 171 in order to minimize the load variation of head slider 165 to the magnetic disk. This variation is caused by dispersion in the distances between slider 165 and disk 166 when the disk drives are manufactured. Cutout section 171 also helps minimize vertical motion (surface wobbling) of the disk. Leaf spring 163 has a small spring constant so that leaf spring 163 is flexible and has reduced rigidity.

The head support device discussed above is disclosed in, e.g. Japanese Examined Patent Publication Nos. 2894262, 3374846, and Japanese Unexamined Patent Publication Nos. H06-259905, 2004-30856, and 2004-62936.

The foregoing conventional head support device should give leaf spring 163 reaction force strong enough for applying load necessary for head slider 165, to which the magnetic head is mounted, to float over magnetic disk 166 in a stable manner. Leaf spring 163 should be flexible in order to suppress changes in the load applied to disk 166, such changes being produced by the dispersion due to manufacturing.

The reaction force and the flexibility conflict with each other, and in order to satisfy these two conflicting factors, cutout section 171 is formed on leaf spring 163, or suspension 162 is formed by using a thin plate to lower the rigidity of leaf spring 163. Use of a leaf spring having a spring constant small enough to be flexible will lower a resonance frequency when head support device 161 moves the magnetic head to a target track at a high speed, so that a vibration mode such as a twist occurs in head support device 161. As a result, an off-track occurs, and it takes time to clear the invited vibration mode, and these inconveniences have set limits on the progress of shortening the access time.

The conventional head support device has its gravity center at a point nearer to the magnetic head than from leaf spring 163. When an external strong impact is applied to the magnetic disk device, this structure loses the balance between the floating force and the urging force; where the floating force is produced by the airflow at head slider 165 due to the spin of magnetic disk 166 and the urging force urges head slider 165 toward disk 166. The imbalance of these two forces results in an undesirable phenomenon, i.e. head slider 165 jumps from disk 166, or head slider 165 hits disk 166, so that the magnetic head (not shown) and disk 166 can be magnetically or mechanically damaged.

These inconveniences occur not only in the magnetic disk device but also in other disk devices, using a floating-type head, such as optical disk devices and magneto optical disk devices.

On top of that, when an external strong impact is applied to a portable electronic device, to which the foregoing magnetic disk device is mounted, the magnetic head (not shown) or magnetic disk 166 is magnetically or mechanically damaged, so that the electronic device poorly performs its function and invites inconveniences to the actual use.

To overcome these inconveniences, a cushion is prepared before the magnetic disk device is mounted to the portable electronic device, e.g. this structure is disclosed in Japanese Unexamined Patent Publication No. 2004-134036. However, since the portable electronic devices have been downsized recently, it is too hard to mount a cushion strong enough to withstand the external impact into the electronic devices.

Several ideas have been proposed for improving the shock resistance of head support device 161 discussed above. For instance, the head support device with the following structure is proposed: a main portion of the head support device is made from highly rigid material, the head slider is mounted on the underside of a first end of the suspension, and the head support arm is rotatable about the bearing in the radial direction of the magnetic disk, and is also movable vertically on the fulcrum (vertical pivot axis) provided between the head slider and the voice coil placed at the second end of the suspension. The leaf spring for imparting the urging force for generating the load to the head slider is provided to the fulcrum. This structure is disclosed in, e.g. Japanese Examined Patent Publication No. 3374846, Japanese Patent Unexamined Publication Nos. 2004-30856, and 2004-62936.

As discussed above, the head slider floats over the disk due to the balance between the load and the floating force, so that if the balance is lost, the head slider floats in an unstable manner. If an external shock strong enough to cancel the load is applied to the disk device, the head slider is floated only by the floating force, and becomes critically unstable. Suppressing the changes at least in the members other than the head slider pivoting about the vertical pivot axis allows suppressing of changes in the load, so that the head slider can float over the disk steadily. It is thus necessary to set a moving amount less than a predetermined amount; the moving amount is measured from the gravity center position of the respective members except the head slider with respect to the vertical pivot axis.

SUMMARY OF THE INVENTION

The present invention aims to provide a head support device of which shock resistance is improved, a disk device having the head support device, and a portable electronic device employing the head support device. The present invention aims to boost the rigidity of the head support device for increasing a resonance frequency significantly, so that stable resonance characteristics can be expected. The present invention still aims to provide a highly flexible head support device which imparts stable load to the head slider and has robust shock resistance. Use of the foregoing head support device allows for improvement in the control characteristics of head positioning, and allows for movement of the magnetic head to a target track at a high speed. As a result, a reliable disk device, of which access time is substantially shortened, can be obtained.

A head support device of the present invention includes the following elements: a head slider including a head element working as a signal transducer; a head support arm of which a first end is coupled to the head slider; a voice coil placed at a second end of the head support arm, which second end is opposite to the head slider with respect to the center of a horizontal rotary shaft about which the head support arm rotates in parallel with a magnetic disk surface; a pair of pivots forming a vertical pivot axis which pivots the head support arm vertically with respect to the disk surface; and an elastic mechanism for generating load which urges the head slider toward the disk surface by using the vertical pivot axis as a center.

In the head support device of the present invention, the gravity center of the total mass of the members, other than the head slider, pivoting about the vertical pivot axis substantially agrees with the position of the vertical pivot axis.

The gravity center position "δ" of the total mass of the members, other than the head slider, pivoting about the vertical pivot axis is set such that the gravity center position "δ" satisfies algebraic expression (1).

$$\delta_2 < \delta < \delta_1 \qquad (1)$$

where a coordinate axis is formed along the head support arm and the origin is set at the vertical pivot axis, one side of the head slider is defined as a positive (+) region, and the opposite side is defined as a negative (−) region.

The gravity center positions of the members, other than the head slider, pivoting on the vertical pivot axis are referred to as $\delta_1^+$ and $\delta_2^+$. These two positions, i.e. $\delta_1^+$ and $\delta_2^+$, are defined in the following manner: when the head slider receives an allowable maximum impact acceleration that pivots the head support arm along the direction in which the head slider approaches the recording disk, and the direction is vertical (generally perpendicular) with respect to the recording disk as well. The foregoing movement of the head slider makes the clearance between the disk surface and the ABS face (air bearing surface) an allowable minimum flying height.

The gravity center positions of the members, other than the head slider, rotating on the vertical pivot axis are referred to as $\delta_1^-$ and $\delta_2^-$. These two positions, i.e. $\delta_1^-$ and $\delta_2^-$, are defined in the following manner: when the head slider receives the allowable maximum impact acceleration that pivots the head support arm along the direction in which the head slider moves away from the recording disk, and the direction is vertical (generally perpendicular) with respect to the recording disk as well. The foregoing movement of the head slider makes the clearance the allowable minimum flying height.

Assume that $\delta_1$ is the smaller one between $\delta_1^+$ and $\delta_1^-$, and $\delta_2$ is the greater one between $\delta_2^+$ and $\delta_2^-$. Then the gravity center position δ of the total mass of the members other than the head slider is set as satisfying the algebraic expression (1).

Such gravity center position δ makes gravity center position ε of all the members, including the head slider, pivoting on the vertical pivot axis satisfy algebraic expression (2).

$$\varepsilon_2 = \frac{m_3 l_2 + m\sigma_2}{m + m_3} < \varepsilon < \varepsilon_1 \qquad (2)$$
$$= \frac{m_3 l_2 + m\sigma_1}{m + m_3}$$

In expression (2), the same definition as in expression (1) is used, namely, one side of the head slider is defined as a positive (+) region, and the opposite side is defined as a negative (−) region.

The gravity center positions of the members, other than the head slider, pivoting on the vertical pivot axis is referred to as gravity center position δ. Gravity center position δ is defined in the following manner: When the head slider receives the allowable maximum impact acceleration that pivots the head support arm along the direction in which the head slider approaches the recording disk, and the direction is vertical (generally perpendicular) with respect to the recording disk as well. The foregoing moving amount of the head slider makes the clearance an allowable maximum moving amount. When gravity center position δ is in the positive (+) region, gravity center position δ is defined as $\delta_1^+$, and when gravity center position δ is in negative (−) region, gravity center position δ is defined as $\delta_2^+$.

The gravity center position of the members pivoting on the vertical pivot axis is referred to as gravity center position δ. Gravity center position δ is defined in the following manner: when the head slider receives the allowable maximum impact acceleration that pivots the head support arm along the direction in which the head slider moves away from the recording disk, and the direction is vertical (generally perpendicular) with respect to the recording disk as well. The foregoing moving amount of the head slider makes the clearance the allowable maximum moving amount. When gravity center position δ is in the negative (−) region, gravity center position δ is defined as $\delta_2^-$, and when gravity center position δ is in the positive (+) region, gravity center position δ is defined as $\delta_1^-$.

Assume that $\delta_1$ is the smaller one between $\delta_1^+$ and $\delta_1^-$, and $\delta_2$ is the greater one between $\delta_2^+$ and $\delta_2^-$.

Assume that the total mass of the members pivoting on the vertical pivot axis except the head slider is "m", and the mass of the head slider is "$m_3$". Assume that the distance between the vertical pivot axis to the center of the head slider along the longitudinal direction of the head support arm is "$l_2$".

In algebraic expression (2), $\delta_1$ indicates the gravity center position expressed by $(m_3 l_2 + m\delta_1)/(m+m_3)$, and $\varepsilon_2$ indicates the gravity center position expressed by $(m_3 l_2 + m\delta_2)/(m+m_3)$.

The structure satisfying both of algebraic expressions (1) and (2) allows for forming of a rigid section and an elastic section into one unit. This structure also allows for setting of the urging force at any strength applied by the elastic mechanism to the head slider, thereby suppressing pivoting of the head support arm caused by an external impact. As a result, the movement of the head slider due to both of the pivots of the head support arm and the impact applied to the head slider can be limited within a range free from the collision between the head slider and the disk surface. The shock resistance can thus be improved, and the higher resonance frequency can thus be expected. The head support device having quick-responsiveness and a shorter access time is thus obtainable.

The head support arm is vertically pivotable with respect to the disk surface, so that the head can be held advantageously away from the disk when the disk is halted.

A head support device of the present invention has its gravity center position at the vicinity of the intersection between the vertical pivot axis and the centerline along the longitudinal direction of the head support arm. This structure allows for eliminating of the force pivoting the head support arm on the longitudinal centerline of the head support arm when the arm receives an external impact. This structure can thus advantageously suppress unnecessary vibrations of the head support arm.

The vertical pivot axis of the head support device of the present invention is perpendicular with respect to the longitudinal centerline of the head support arm and the axial center of the horizontal rotating shaft. This structure allows the ABS face, which confronts the disk, of the head slider to move in parallel with the disk surface in response to the rotation of the head support arm. If the head support arm pivots due to external force, e.g. impact, or due to surface wobble caused by the spin of the disk, the head slider keeps moving in parallel with the disk surface. This structure allows the disk drive to prevent signals from being lost in recording or reproducing. The head support device that is excellent in shock resistance is thus obtainable.

A head support device of the present invention has a pair of pivots forming the vertical pivot axis, and the respective apexes of the pivots are placed symmetrically with respect to the longitudinal centerline of the head support arm. This structure allows for improving of the weight balance along the width direction of the head support arm, so that the head support device that is excellent in shock resistance is obtainable.

A head support device of the present invention has a vertical pivot axis extending through the rotary center of the horizontal rotating shaft. This structure allows for minimizing of occurrences of movement of the vertical pivot axis due to an external impact when the external impact is applied along the perpendicular direction with respect to the disk surface. The head support device that is excellent in shock resistance is thus obtainable.

A head support device of the present invention has the head support arm which incorporates an elastic mechanism that generates load. Parts of the elastic mechanism are fixed to a head rotating arm which rotates on the horizontal rotary shaft and generally in parallel with the disk surface. On top of that, the vertical pivot axis, about which the head support arm generally pivots in the perpendicular direction with respect to the disk surface, stays away from the rotary center of the horizontal rotating shaft. This structure allows for downsizing of the head support arm as well as reducing the weight thereof. The head support arm and other members can be formed of highly rigid materials, so that the head support device that is excellent in shock resistance is obtainable.

A head support device of the present invention has the head slider fixed to a gimbal mechanism that is flexible enough for controlling a floating posture of the head slider, and the gimbal mechanism is coupled to an end of the head support arm. This structure allows for supporting of the head slider along the rolling direction and the pitching direction as well, thereby absorbing unnecessary slant of the head slider in the rolling and pitching directions with respect to the disk.

A disk device of the present invention includes a recording disk spun by the spindle motor and a head support device having a signal transducer confronting the disk for recording or reproducing a signal on the disk. This structure realizes excellent shock resistance, improves control characteristics of the head positioning performance, and moves the head to a target track at a high speed. As a result, the access time can be substantially shortened, so that an excellent disk device with an extremely high access speed is obtainable.

A portable electronic device of the present invention includes the foregoing disk device, so that the magnetic head and the disk of the disk device are free from damage when an external impact is applied to the portable electronic device, which thus advantageously operates without impairment of its functions.

The head support device of the present invention can rotate on the horizontal rotating shaft in parallel with the disk surface. The head slider, to which the head is mounted, is coupled to the head support arm by the gimbal mechanism excellent in flexibility, and the arm can pivot on the vertical pivot axis, which is formed of a straight line between the respective apexes of a pair of pivots, along the (generally perpendicular) direction with respect to the disk surface. The head support device includes a leaf spring, a kind of the elastic mechanism, imparting the urging force to the head slider for generating the load. The gravity center position of the total mass of the members, other than the head slider, pivoting about the vertical pivot axis is located near the vertical pivot axis.

The structure of the foregoing head support arm allows for forming of the highly rigid arm, so that this structure improves shock resistance of the arm against an external large impact, and increases the resonance frequency as well. The structure also allows for advantageously moving and positioning the head support device at a high speed. On top of that, the structure allows for eliminating such inconveniences as inviting damage to the head or the disk surface when an external shock is applied to the disk surface along the vertical direction and then the head slider having the head touches or hits the disk. The head support device having great shock resistance is thus obtainable.

A disk device, to which the head support device of the present invention is mounted, thus becomes excellent both in shock resistance and access speed. The disk device using the head support device of the present invention is mounted to a portable electronic device, which thus becomes substantially excellent in shock resistance.

DESCRIPTION OF PREFERRED EMBODIMENTS

Exemplary embodiments of the present invention are demonstrated hereinafter with reference to the accompanying drawings.

Exemplary Embodiment 1

Figure 1:
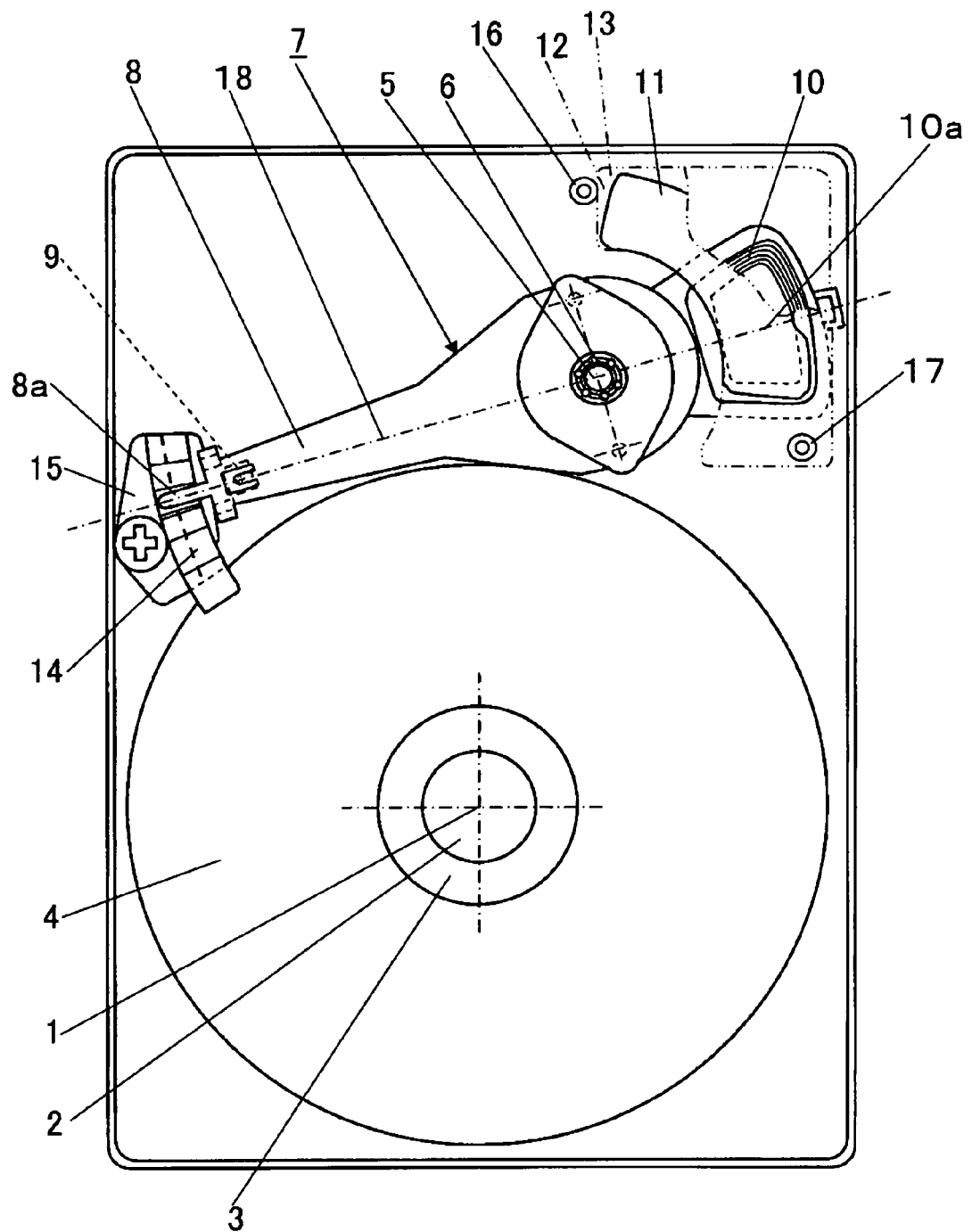
FIG. 1 shows a plan view illustrating an essential part of a magnetic disk drive in accordance with a first embodiment of the present invention.
Figure 2:
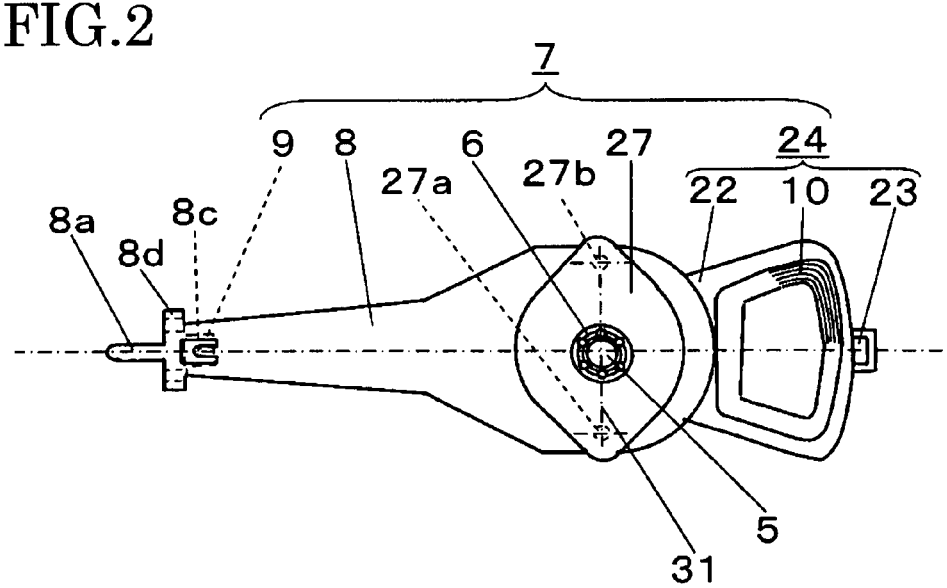
FIG. 2 shows a plan view illustrating a head support device in accordance with the first embodiment of the present invention.
Figure 3:
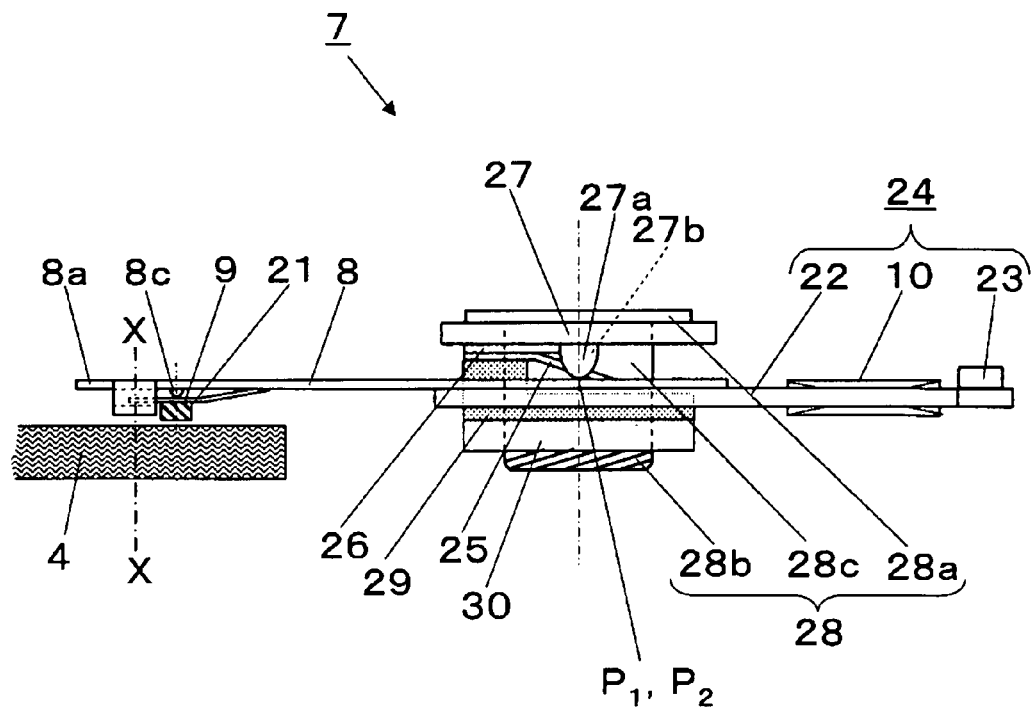
FIG. 3 shows a lateral view illustrating a structure of the head support device in accordance with the first embodiment of the present invention.
Figure 4:
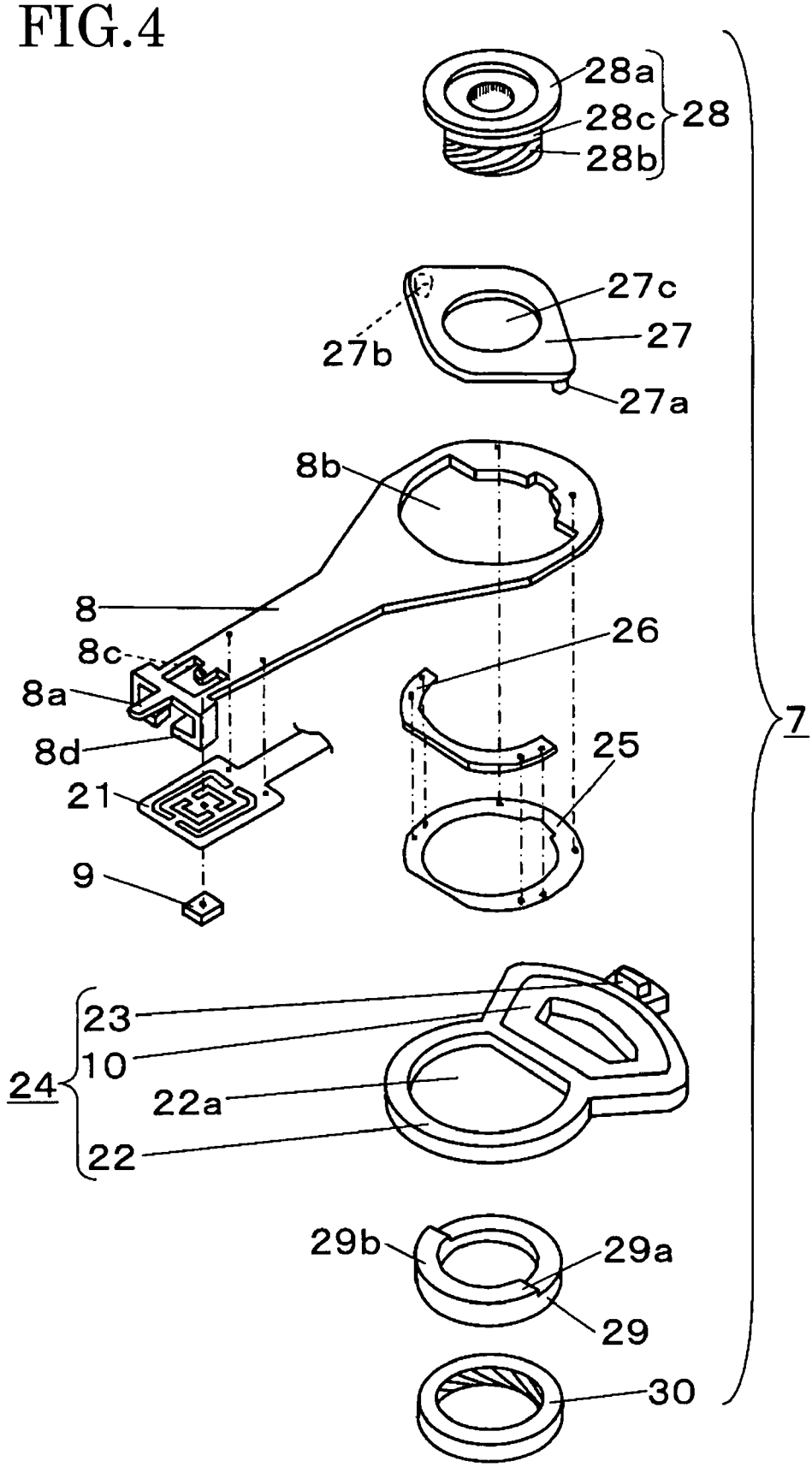
FIG. 4 shows an exploded perspective view illustrating a structure of the head support device in accordance with the first embodiment of the present invention.
Figure 5:
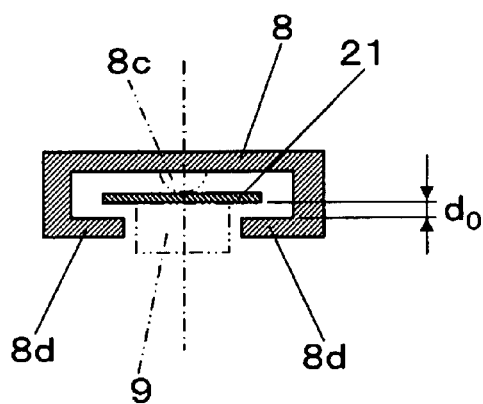
FIG. 5 shows a lateral view illustrating a positional relation between a limiter and a gimbal mechanism of a head support arm viewed from a tab in accordance with the first embodiment of the present invention.
Figure 6:
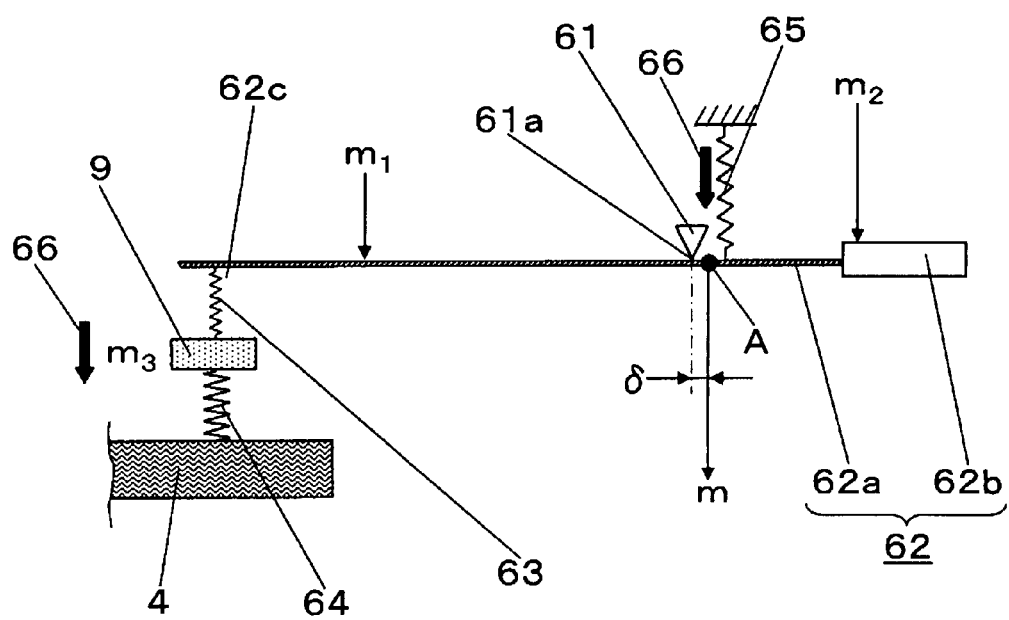
FIG. 6 shows a schematic view of the head support device in part in accordance with the first embodiment of the present invention.
Figure 7A:
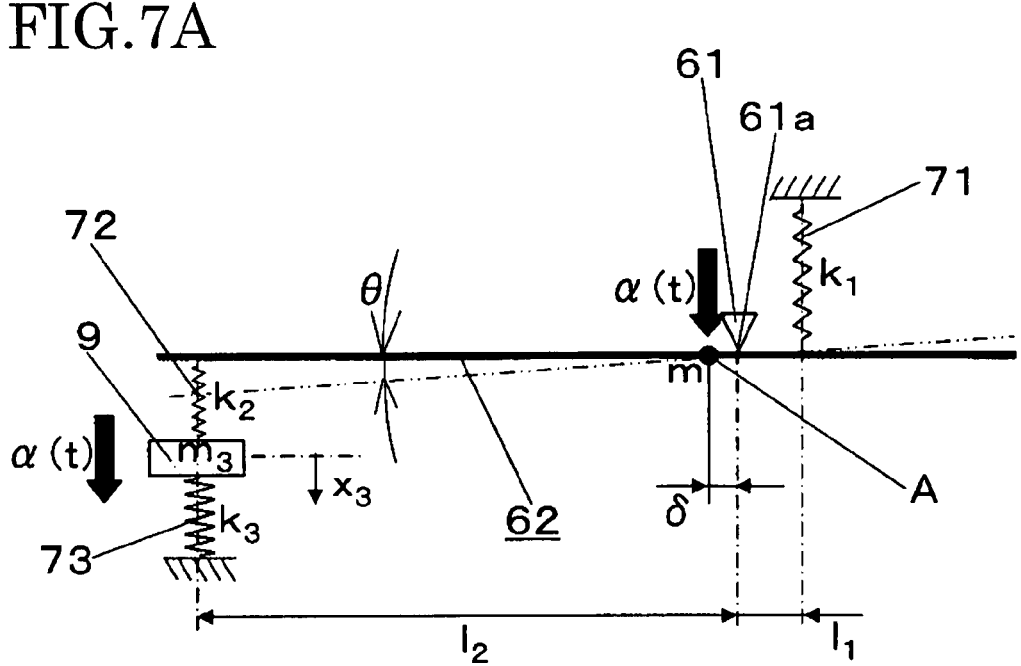
FIG. 7A schematically shows a relation between an impact applied to a beam pivoting counter-clockwise on a fulcrum and a moving distance of the beam in accordance with the first embodiment.
Figure 7B:
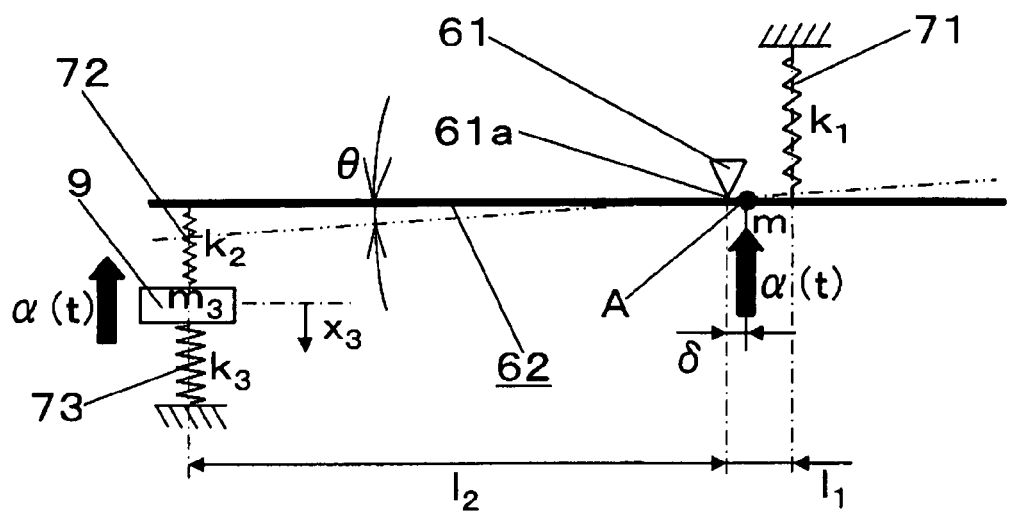
FIG. 7B schematically shows another relation between an impact applied to the beam pivoting counter-clockwise on the fulcrum and a moving distance of the beam in accordance with the first embodiment.
Figure 8A:
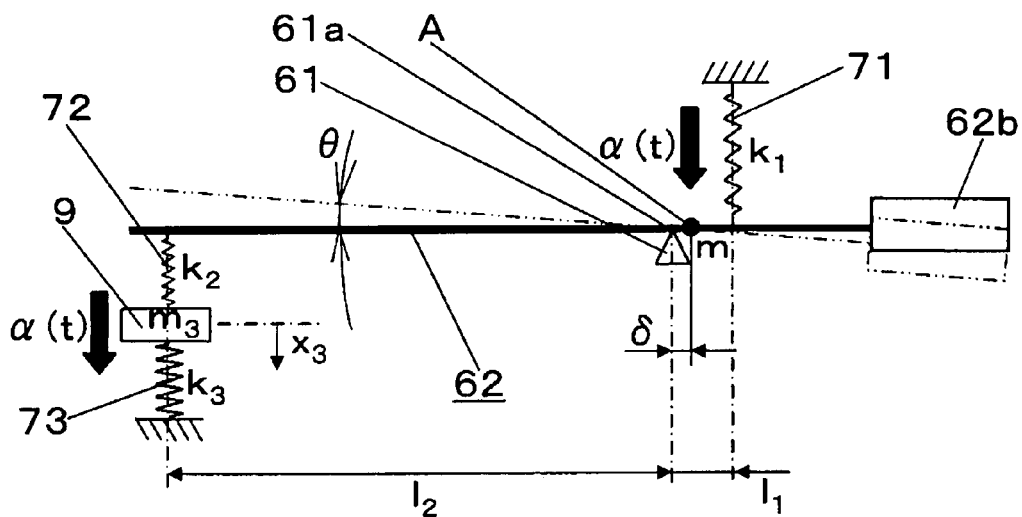
FIG. 8A schematically shows a relation between an impact applied to the beam pivoting clockwise on the fulcrum and a moving distance of the beam in accordance with the first embodiment.
Figure 8B:
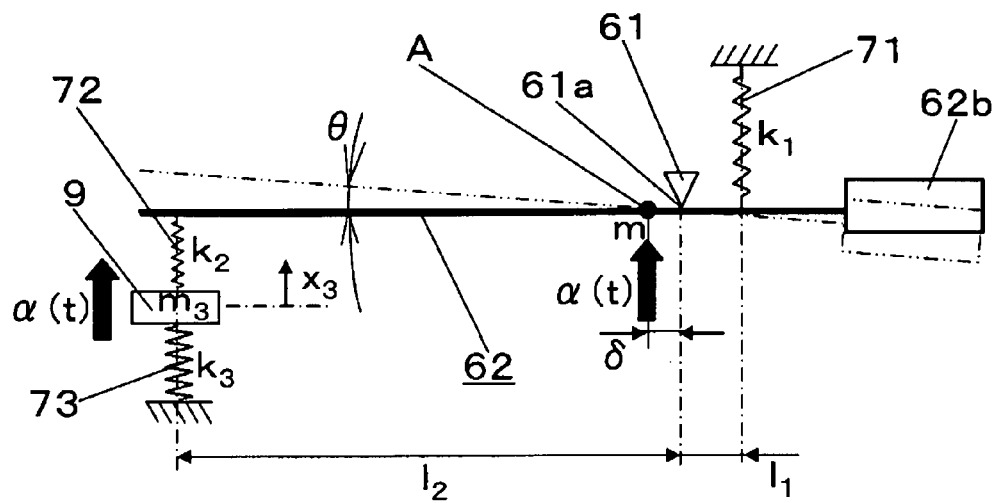
FIG. 8B schematically shows another relation between an impact applied to the beam pivoting clockwise on the fulcrum and a moving distance of the beam in accordance with the first embodiment.
Figure 9:
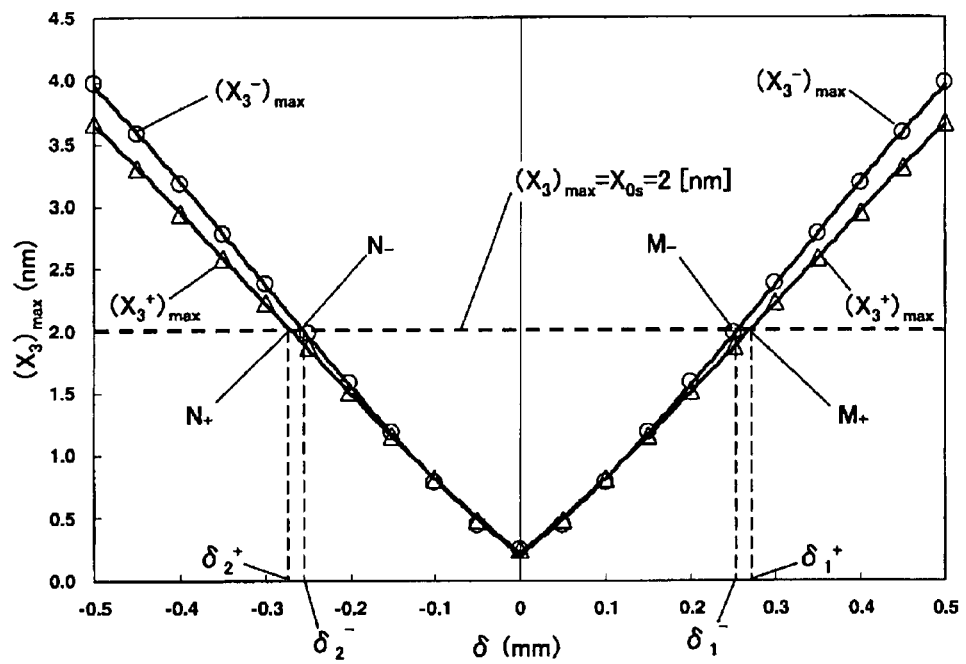
FIG. 9 shows a relation between gravity center position 5 and a moving distance in accordance with the first embodiment.
Figure 10:
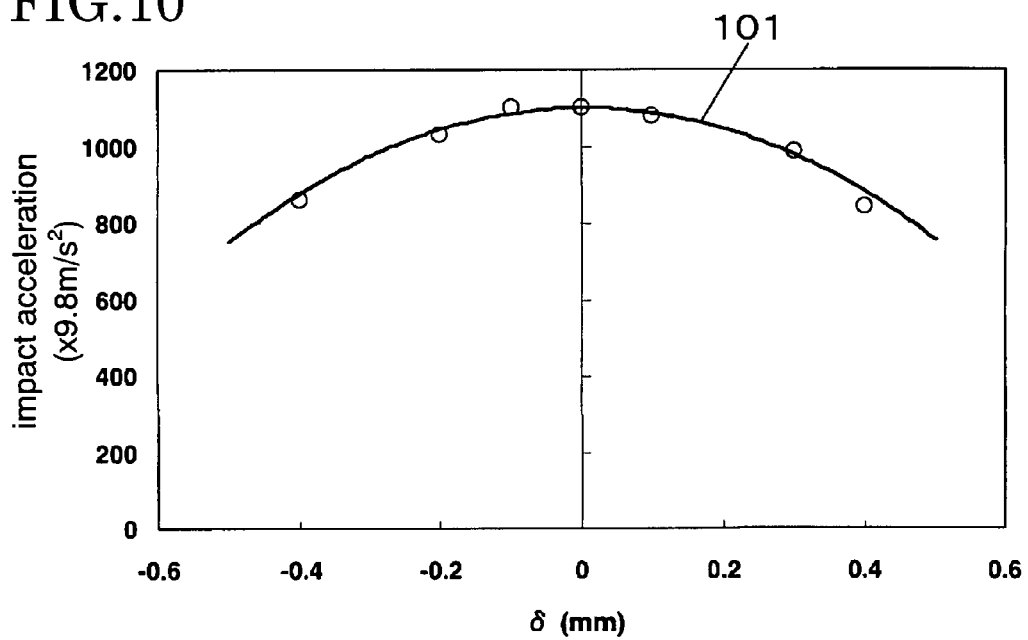
FIG. 10 shows a result of an experiment on finding a relation between gravity center position δ and an impact acceleration that invites no damage on the disk or the head slider.
Figure 11:
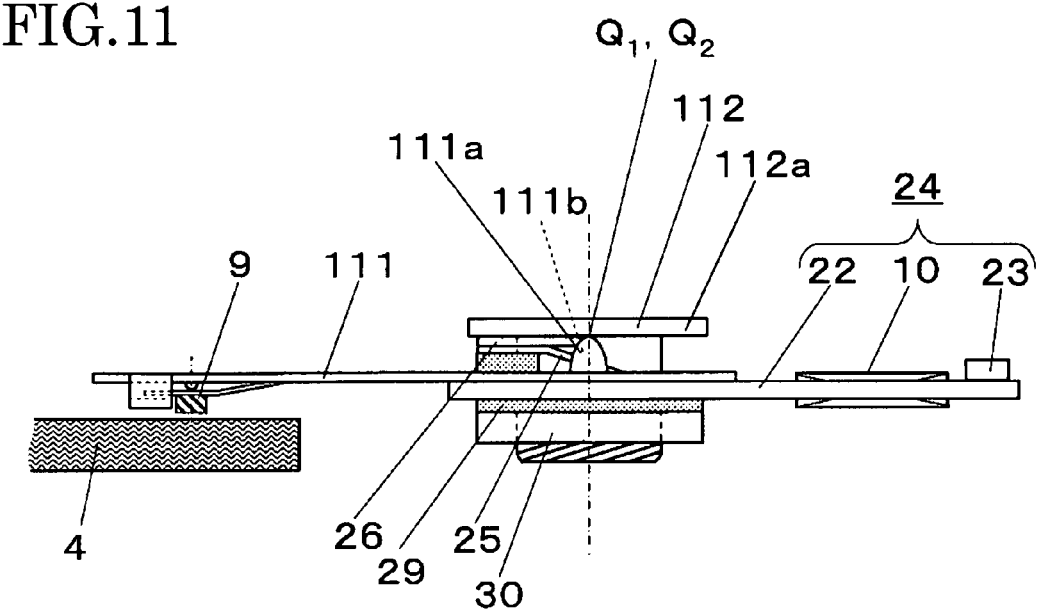
FIG. 11 shows a lateral view illustrating another structure of a vertical pivot axis of the head support arm in accordance with the first embodiment.

FIG. 1-FIG. 11 illustrate a head support device and a disk device employing the same head support device in accordance with a first embodiment of the present invention. FIG. 1 shows a plan view illustrating an essential part of a magnetic disk drive. FIG. 2 shows a plan view illustrating the head support device. FIG. 3 shows a lateral view illustrating a structure of the head support device. FIG. 4 shows an exploded perspective view illustrating the structure of the head support device. FIG. 5 shows a lateral view illustrating a positional relation between a limiter and a gimbal mechanism of a head support arm viewed from a tab. FIG. 6 shows a schematic view of the head support device in part. FIG. 7A schematically shows a relation between an impact applied to a beam pivoting counter-clockwise on a fulcrum and a moving distance of the beam. FIG. 7B schematically shows another relation between an impact applied to the beam pivoting counter-clockwise on the fulcrum and a moving distance of the beam. FIG. 8A schematically shows a relation between an impact applied to the beam pivoting clockwise on the fulcrum and a moving distance of the beam. FIG. 8B schematically shows another relation between an impact applied to the beam pivoting clockwise on the fulcrum and a moving distance of the beam. FIG. 9 shows a relation between gravity center position δ and the maximum moving distance $(x_3)_{max}$ of the head slider. FIG. 10 shows a result of an experiment on finding a relation between gravity center position δ and an impact acceleration that invites no damage on the disk or the head slider. FIG. 11 shows a lateral view illustrating another structure of a vertical pivot axis of the head support arm. Meanwhile FIG. 1 shows a state with an upper lid removed and with an upper yoke partially omitted.

In FIG. 1, disk 4 having a recording medium layer on its surface is placed on rotor hub 3 fixed to rotary shaft 2 of a spindle motor (not shown) spinning on rotary center 1. Head support arm 8, i.e. signal transducer swing arm, is supported rotatably on rotary shaft 5 via bearing 6. Head support device 7 can rotate on the center axis of rotary shaft 5, so that it rotates substantially in parallel with the surface of disk 4.

Head support device 7 has tab 8a at a first end of head support arm 8, and also it has head slider 9 including a magnetic head (not shown), i.e. a signal transducer, via a gimbal mechanism (not shown) nearer to pivot shaft 5 than from tab 8a. Voice coil 10 is placed at a second end of head support arm 8, which thus rotates on rotary shaft 5 in parallel with the surface of disk 4 along the radial direction of disk 4. Upper yoke 12, to which a magnet is fixed, is mounted to a chassis or another housing such that yoke 12 is placed above voice coil 10 and confronts coil 10, namely, yoke 12 is placed on the other side to disk 4 with respect to head support device 7.

Lower yoke 13 is mounted to the chassis or another housing such that yoke 13 and yoke 12 sandwich voice coil 10, and yoke 12 is placed under voice coil 10 and confronts coil 10. The voice coil motor (hereinafter referred to as VCM) is thus formed of voice coil 10, magnet 11 confronting voice coil 10, upper yoke 12 to which magnet 11 is fixed, and lower yoke 13. Ramp block 15 is mounted to the chassis or another housing, where ramp block 15 works as a head holding member including ramp 14 in which a guide section is provided for guiding head support device 7 upward or downward by touching tab 8a provided to device 7.

Supply of electric current to voice coil 10 facing magnet 11 allows operation of the VCM (voice coil motor), and then head support device 7 rotates along the radial direction of disk 4. During the operation of the disk device, head support device 7 rotates on rotary shaft 5 and moves over the active area of spinning disk 4. When the disk device is at rest, the VCM rotates head support device 7 clockwise until device 7 arrives at a predetermined position in ramp 14 where head support device 7 can park. As well known, crush stoppers 16 and 17 are provided to the chassis or another housing in order to prevent head support device from rotating clockwise or counter-clockwise excessively.

A structure of head support device 7 is described with reference to FIGS. 2-4. In these drawings, head support arm 8 has tab 8a at its first end and hole 8b at its second end, and head slider 9, to which a magnetic head (not shown) is mounted via gimbal mechanism 21, is provided to head support arm 8 on tab 8a side. Bulge 8c is provided on an underside of head support arm 8 such that it touches near the center of head slider 9, and head slider 9 is mounted to head support arm 8 via gimbal mechanism 21.

Bulge 8c touches gimbal mechanism 21 or approx. the center of the top face of head slider 9, namely, bulge 8c touches the other side of the head mounted face, so that this structure allows head slider 9 to flexibly follow unnecessary vibrations of disk 4 in the rolling or pitching direction during the operation of the disk device. When head support device 7 unloads the head from disk 4, this structure prevents gimbal mechanism 21 from being deformed because head slider 9 fixed to gimbal mechanism 21 moves away from bulge 8c provided to head support arm 8 due to negative pressure applied to head slider 9.

Limiter 8d is provided to head support arm 8 having head slider 9 such that clearance $d_0$ is secured between gimbal mechanism 21 and limiter 8d, as shown in FIG. 5 later detailed. When gimbal mechanism 21 is apart from bulge 8c by a given distance, limiter 8d touches gimbal mechanism 21 for regulating the distance spaced between bulge 8c and gimbal mechanism 21.

Voice coil 10 is mounted to voice coil holder 22 having hole 22a, and balancer 23 is fixed to voice coil section 24 at the end opposite to hole 22a with respect to voice coil 10. Voice coil section 24 is fixed to head support arm 8, which is formed of members independent of those of head support arm 8 in this embodiment. However, the present invention is not limited to this embodiment, e.g. these two elements can be integrated into one unit, or balancer 23 is not necessarily provided independently of other elements. Holder 22 can employ a larger external appearance so that it can be additionally equipped with a balance adjusting function.

Annular leaf spring 25, a kind of the elastic mechanism, is fixed to the underside (the same face where slider 9 is placed) of head support arm 8 at a first end of spring 25, and semi-circular spring fixer 26 is fixed to a top face (the same face fixed to head support arm 8) of a second end of spring 25.

FIG. 4 shows an exploded perspective view of support device 7. Pivot bearing 27 includes a pair of pivots 27a and 27b placed on its ends, and hole 27c is provided at its center. Bearing section 28 includes flange 28a and screwing section 28b. Cylindrical section 28c is provided between flange 28a and screwing section 28b. Bearing section 28 outwardly looks like a hollow cylinder with a flange. An outer diameter of bearing section 28 is greater than an inner diameter of hole 27c, and an outer diameter of screwing section 28b is smaller than an inner diameter of hole 27c. Cylinder section 28c has an outer diameter to be engaged with hole 27c.

Bearing section 28 extends through hole 27c of pivot bearing 27, inside of semi-circular spring fixer 26, inside of annular leaf spring 25, and through hole 22a of voice coil holder 22. As already described, voice coil section 24 is formed by mounting voice coil 10 to holder 22 having hole 22a, and balancer 23 is mounted to head support arm 8 at the end opposite to hole 22a with respect to voice coil 10. This voice coil section 24 is fixed to head support arm 8.

Hollow collar 29 is engaged with and inserted into cylindrical section 28c of bearing section 28 from the side opposite flange 28a such that protrusion 29a comes to the same side as flange 28a of bearing section 28. Hollow collar 29 has an inner diameter to be engaged with cylindrical section 28c and an outer diameter to extend through hole 22a of voice coil holder 22. Collar 29 includes protrusion 29a shaped like a semi-circle similar to spring fixer 26 fixed to annular leaf spring 25.

Top face 29b of protrusion 29a touches a flat section of the semi-circular spring fixer 26 fixed to leaf spring 25. Collar 29, spring fixer 26 and the flat section of leaf spring 25 are sandwiched together by flange 28a and nut 30 into one body, so that head support device 7 is formed.

Leaf spring 25, which is fixed to head support arm 8 via collar 29 and spring fixer 26, is sandwiched by flange 28a and nut 30. The apexes of the pair of pivots 27a and 27b provided to pivot bearing 27 are brought into contact with the top face (the other side with respect to the head slider 9 mounted side) of head support arm 8.

Head support arm 8 is elastically coupled to pivot bearing 27 with leaf spring 25, a kind of the elastic mechanism, via the pair of pivots 27a and 27b. This structure allows leaf spring 25 to depress head support arm 8 at tab 8a side downward on the fulcrum formed of a straight line between contact points $P_1$ and $P_2$, which are contact points of pivots 27a and 27b respectively to the top face of head support arm 8.

In other words, head support arm 8 can pivot on vertical pivot axis 31, formed of the straight line between contact points $P_1$ and $P_2$, vertically with respect to the surface of disk 4. During the operation of the disk device, head slider 9 mounted to head support arm 8 via gimbal mechanism 21 thus floats over the surface of disk 4. The load applied to head slider 9 at this time is generated by the compressive stress toward disk 4 as reaction force due to deformation of leaf spring 25 with respect to head support arm 8 by contact points $P_1$ and $P_2$ of the pair of pivots 27a and 27b. Head slider 9 floats depending on the relation between the urging force applied to head slider 9 toward disk 4 and the floating force applied along the direction opposite to the urging force. A given clearance between disk 4 and head slider 9, i.e. the magnetic head, is maintained for the disk device to read or write data.

A position of the pair of pivots 27a and 27b provided to pivot bearing 27, one of the elements of head support device 7, is described hereinafter. Pivots 27a and 27b touch the top face of head support arm 8 at contact points $P_1$ and $P_2$, and the straight line drawn between contact points $P_1$ and $P_2$ forms vertical pivot axis 31, which runs through the axial line of rotary shaft 5 of head support device 7 shown in FIG. 1, and yet, axis 31 is perpendicular with respect to centerline 18 along the longitudinal direction of head support device 7. Contact points $P_1$ and $P_2$ are desirably placed symmetrically with respect to the axial line of rotary shaft 5, so that the mid-point of the line between contact points $P_1$ and $P_2$ generally agrees with the axial line of shaft 5. This structure allows for pivoting of head support arm 8, an element of head support device 7, about the straight line between contact points $P_1$ and $P_2$ along the vertical (generally perpendicular) direction with respect to the surface of disk 4. The elastic force of leaf spring 25 thus urges head slider 9 mounted to head support arm 8 toward disk 4.

The foregoing structure of head support device 7 allows for forming of head support arm 8 from highly rigid material, so that the shock resistance of head support arm 8 against an external large impact can be improved, and the resonance frequency of head support arm 8 can thus be increased.

As a result, the structure discussed above can eliminate the vibration mode which has caused troubles, so that a settling action is no longer needed, which allows for rotating and positioning head support device 7 at a higher speed. The foregoing structure can also increase the access speed of the magnetic disk device. Leaf spring 25, a kind of elastic mechanism, is not incorporated into one unit as head support arm 8, but it is independent of head support arm 8, so that the structure satisfies all at once the conditions contradictory to each other such as greater load applied to head slider 9, more flexibility, and higher rigidity in the structure. Head support device 7 can thus be designed more simply and flexibly.

A conventional head support arm needs an elaborate forming process for a leaf spring; however, the present invention allows for forming of the head support arm rather simply, and a thickness and material of leaf spring 25 can be determined for itself, so that the strength and the spring constant of leaf spring 25 can be set at desirable values.

On top of that, the mass (weight) of balancer 23 is adjusted such that the total gravity center position of the structural elements of head support device 7 is positioned at a predetermined place. The structural elements include head support arm 8, voice coil section 24, a section touching head support arm 8 and belonging to leaf spring 25, gimbal mechanism 21 and balancer 23. Gimbal mechanism 21 is fixed to head slider 9 and couples head slider 9 with head support arm 8. Balancer 23 is then fixed to an end of voice coil holder 22; however, balancer 23 is sometimes preferably placed at the other side of head support arm 8, i.e. near to head slider 9, depending on the distribution of the mass (weight) of the respective structural elements.

When head support device 7 as structured above receives an external impact applied along the axial line (perpendicular direction with respect to the surface of disk 4) of horizontal rotary shaft 5, the actions of head support arm 8 and head slider 9 are demonstrated hereinafter with reference to FIG. 6. In FIG. 6, apex 61a of fulcrum 61 represents vertical pivot axis 31 (refer to FIG. 2), which is formed of a straight line connecting contact points $P_1$ and $P_2$ where the pair of pivots 27a and 27b of pivot bearing 27 shown in FIG. 3 respectively touch the top face of head support arm 8. Beam 62 represents the section held by leaf spring 25, the elastic mechanism, other than head slider 9 shown in FIG. 3. In other words, beam 62 is formed of beam section 62a and member 62b. Beam section 62a is formed by incorporating head support arm 8, voice coil holder 22, the section touching head support arm 8 and belonging to leaf spring 25, and gimbal mechanism 21 into one unit. Member 62b is formed by incorporating voice coil 10 and balancer 23 into one unit.

Beam 62 includes peak 62c corresponding to bulge 8c of head support arm 8, shown in FIG. 3 and touches head slider 9. Gimbal mechanism 21 made from super-flexible material is schematically drawn as spring 63, and indicates that head support arm 8 and head slider 9 are coupled together elastically. Head slider 9 regularly touches bulge 8c with a small pre-load via gimbal mechanism 21. Spring 64 indicates actually the floating force applied to head slider 9, i.e. the difference between a positive pressure and a negative pressure generated around head slider 9 by the spin of disk 4.

Spring 65 indicates elastic force of leaf spring 25 for applying load to head slider 9. During the normal operation of the disk device, the load from spring 65 and the floating force by spring 64 balance each other, thereby floating head slider 9 over disk 4.

In FIG. 6, assume that beam 62 has a total mass "m", its gravity center position is located at point "A", a first portion of beam 62, namely, the portion of the beam on head slider 9 side from fulcrum 61, has mass "$m_1$", and second portion of beam 62, namely, the portion of the beam on the other side of head slider 9, has mass "$m_2$", and head slider 9 has mass "$m_3$". An impact is applied to this beam 62 and head slider 9 along the perpendicular direction with respect to disk 4, i.e. along arrow mark direction 66, and then beam 62 pivots on apex 61a of fulcrum 61, at that time, the load applied by spring 65 is to change.

On the other hand, head slider 9 receives the impact applied along arrow mark direction 66; however, the spin of disk 4 generates negative pressure and positive pressure, so that the motion of beam 62 does not always agree with the motion of head slider 9 coupled to beam 62 via spring 63 made from super-flexible material.

Since head slider 9 floats over disk 4 due to the balancing relation between the load and the floating force, serious breakage in the balancing relation makes the floating of head slider 9 unstable. If head slider 9 receives an external impact strong enough to cancel the load, head slider 9 floats in response to only the magnitude of the floating force, so that the balancing relation becomes seriously unstable. If a change in the load due to the external force can be regulated, head slider 9 can float steadily.

When the external impact is applied, an action of beam 62 and an action of head slider 9 can be separately taken into consideration. When beam 62 receives an impact, pivot moment acts on beam 62 to pivot on fulcrum 61. The direction of this pivot moment is determined by a direction of the impact applied to beam 62 and gravity center position "A" of beam 62 with respect to fulcrum 61. FIGS. 7A, 7B, 8A and 8B are schematic diagrams illustrating the combinations of the directions of the impact applied to beam 62 and the gravity center positions of beam 62.

Next, the actions of beam 62 and head slider 9 in response to the respective combinations of the directions of the impact applied to beam 62 and the gravity center positions of beam 62 are demonstrated here.

FIG. 7A shows a state where gravity center position "A" of beam 62 with respect to fulcrum 61 is located on head slider 9 side, and this state shows that an impact is applied perpendicular with respect to beam 62 and along the direction from beam 62 toward slider 9.

FIG. 7B shows a state where gravity center position "A" of beam 62 with respect to fulcrum 61 is located on member 62b side (opposite to head slider 9), and this state shows that an impact is applied perpendicular with respect to beam 62 and along the direction from slider 9 toward beam 62. In either case, beam 62 pivots counter-clockwise on apex 61a of fulcrum 61, i.e. pivots such that head slider 9 approaches disk 4.

FIG. 8A shows a state where gravity center position "A" of beam 62 with respect to fulcrum 61 is located on member 62b side (opposite to head slider 9), and this state shows that an impact is applied perpendicular with respect to beam 62 and along the direction from beam 62 toward slider 9.

FIG. 8B shows a state where gravity center position "A" of beam 62 with respect to fulcrum 61 is located on head slider 9 side, and this state shows that an impact is applied perpendicularly with respect to beam 62 and along the direction from slider 9 toward beam 62. In either case, beam 62 pivots clockwise on apex 61a of fulcrum 61, i.e. pivots such that head slider 9 moves away from disk 4.

The external impact acts on the gravity center of beam 62 as well as on the gravity center of head slider 9. The impact applied along the direction from beam 62 toward slider 9 and the impact along the reverse direction make the impact act on slider 9 in different directions. The reference marks used in FIGS. 7A, 7B, 8A, and 8B are defined as follows:

m=total mass of the members pivoting on the vertical pivot axis except the head slider;

$m_3$=mass of head slider 9;

$J_0$=inertia moment of total mass of the members pivoting on the vertical pivot axis except the head slider about the gravity center;

δ=gravity center position "A" of beam 62 based on apex 61a of fulcrum 61 as the origin;

$l_1$=distance from apex 61a of fulcrum 61 to spring 71 (for applying load);

$l_2$=distance from apex 61a of fulcrum 61 to the center of head slider 9;

$k_1$=spring constant of spring 71;

$k_2$=spring constant of spring 72 (gimabal mechanism section coupling head slider 9 to beam 62)

$k_3$=spring constant of spring 73 (corresponding to the floating force applied to slider 9);

g=gravity acceleration;

α(t)=impact acceleration of an external impact

θ=pivoting angle of beam 62 from its normal position when beam 62 receives impact acceleration α(t);

$x_3$=change in extension of spring 73 from its normal working position when spring 73 receives impact acceleration a(t), and =moving amount of head slider 9 from its normal position.

In addition to the foregoing definitions, δ, α(t), θ, and $X_3$ are defined as follows: δ: along beam 62, apex 61a being as the origin, and on the head slider side as the (+) region, and on member 62b side as the (−) region. α(t): the direction from beam 62 toward slider 9 as the (+) region, and the direction from slider 9 toward beam 62 as the (−) region. θ: apex 61a as the pivot center, and counter-clockwise direction as (+) and clockwise direction as (−). x3: direction opposite to beam 62 (on disk 4 side) as (+), and direction toward beam 62 as (−). Those are symbolized.

Pivot torque "T" of beam 62 is defined as follows upon receiving impact acceleration α: counter-clockwise direction of "T" is denoted (+), and clockwise direction of "T" is denoted (−). When impact acceleration α is applied, pivot angle θ of beam 62 and moving distance $x_3$ of head slider 9 are both micro-amounts.

In FIGS. 7A, 7B, 8A, and 8B, beam 62 and head slider 9 move according to motion equations (3) and (4) respectively.

$$(J_0 + m\sigma^2)\frac{d^2\theta}{dt^2} = \sigma m\alpha(t) - (k_1 l_1^2 + k_2 l_2^2)\theta \tag{3}$$

$$m\frac{d^2 x_3}{dt^2} = -k_3 x_3 - k_2(x_3 - l_2\theta) + m_3\alpha(t) \tag{4}$$

Equation (3) can be rearranged as equation (3-1).

$$(J_0 + m\sigma^2)\frac{d^2\theta}{dt^2} + (k_1 l_1^2 + k_2 l_2^2)\theta = \sigma m\alpha(t) \tag{3-1}$$

Equation (4) can be rearranged as equation (4-1).

$$m_3\frac{d^2 x_3}{dt^2} + (k_2 + k_3)x_3 = k_2 l_2\theta + m_3\alpha(t) \tag{4-1}$$

The actions of beam 62 and head slider 9 can be understood by solving the respective motion equations (3-1) and (4-1).

Assume that beam 62 and head slider 9 receive an external impact of which acceleration is α(t) expressed by equation (5), then rearrange equation (3-1) into equation (3-2), where respective factors in equation (3-2) are expressed by equations (3a) and (3b).

$$\alpha(t) = \alpha\cos\omega t \tag{5}$$

$$\frac{d^2\theta}{dt^2} + A_1\theta = A_2\cos\omega t \tag{3-2}$$

$$A_1 = \frac{k_1 l_1^2 + k_2 l_2^2}{J_0 + m\sigma^2} \tag{3a}$$

$$A_2 = \frac{\sigma \times m\alpha}{J_0 + m\sigma^2} \tag{3b}$$

A at time "t"=0, pivot angle θ is 0, so that solving equation (3-2) results in equation (6), where respective factors of equation (6) are expressed by equations (6a), (6b) and (6c).

$$\theta = B_0\cos(\omega_0 t - \psi_0) + B_1\cos\omega t \tag{6}$$

$$\omega_0^2 = \frac{k_1 l_1^2 + k_2 l_2^2}{J_0 + m\sigma^2} \tag{6a}$$

$$B_0 = \frac{-B_1}{\cos\psi_0} \tag{6b}$$

$$B_1 = \frac{A_2}{\omega_0^2 - \omega^2} \tag{6c}$$

Besides, at time (t)=0, an angular speed of pivot angle θ is 0 (zero), and the relation expressed by equation (6d) is found.

$$\psi_0 = 0 \tag{6d}$$

As a result, equation (6-1) is obtained.

$$\theta = -\frac{A_2}{\omega_0^2 - \omega^2}\cos\omega_0 t + \frac{A_2}{\omega_0^2 - \omega^2}\cos\omega t \tag{6-1}$$

Next, the θ obtained by equation (6-1) and equation (5) are substituted into equation (4-1) to find equation (7) that is a solution of $x_3$, which indicates an action of head slider 9, where respective factors of equation (7) are expressed by equations (7a), (7b), (7c) and (7d).

$$x_3(t) = C_0\cos(\omega_1 t - \psi_1) + C_1\cos\omega_0 t + C_2\cos\omega t \tag{7}$$

$$\omega_1^2 = \frac{k_2 + k_3}{m_3} \tag{7a}$$

$$C_0 = -\frac{C_1}{\cos\psi_{12}} - \frac{C_2}{\cos\psi_1} \tag{7b}$$

$$C_1 = \frac{\frac{k_2 l_2}{m_3} \times \frac{A_2}{\omega_0^2 - \omega^2} + \alpha}{\omega_1^2 - \omega^2} \tag{7c}$$

$$C_2 = \frac{\frac{k_2 l_2}{m_3} \times \frac{A_2}{\omega_1^2 - \omega^2} + \alpha}{\omega_1^2 - \omega^2} \tag{7d}$$

Since the speed of head slider 9 is 0 (zero) at time "t"=0, the equation (7e) is found.

$$\psi = 0 \tag{7e}$$

Based on equations (7) and (7a)-(7e), equation 7 can be expressed by equation (7-1), where "$C_0$" is expressed by equation (7b-1).

$$x_3(t) = C_0 \cos \omega_1 t + C_1 \cos \omega_0 t + C_2 \cos \omega t \quad (7\text{-}1)$$

$$C_0 = (-C_1) + (-C_2) \quad (7\text{b-}1)$$

Equation (7-1) is rearranged into equation (7-2).

$$x_3(t) = -(C_1 + C_2) \cos \omega_1 t + C_1 \cos \omega_0 t + C_2 \cos \omega t \quad (7\text{-}2)$$

Use of equation (7-2) will find a position of head slider 9 when the external impact is applied to both of beam 62 and head slider 9 based on the origin of head slider 9 at its normal operation. In equations (7-2), (7a), (7b), (7c), (7d) and (6a), the relation of ($\delta > 0$, $\alpha > 0$) corresponds to FIG. 7A, the relation of ($\delta < 0$, $\alpha < 0$) corresponds to FIG. 7B, the relation of ($\delta < 0$, $\alpha > 0$) corresponds to FIG. 8A, and the relation of ($\delta > 0$, $\alpha < 0$) corresponds to FIG. 8B.

In equation (7-2), assume that $x_3(t)$ takes its maximum value $(x_3)_{max}$ at time "$t$"=$t_0$, then equation (8-1) is obtained.

$$|x_3|_{max} = x_3(t_0) = (C_1 + C_2) \cos \omega_1 t_0 + C_1 \cos \omega_0 t_0 + C_2 \cos \omega t_0 \quad (8\text{-}1)$$

$C_1$ and $C_2$ on the right side of equation (8-1) includes $\omega_0$ and $A_2$ both of which are functions of distance $\delta$, so that $C_1$ and $C_2$, namely $(x_3)_{max}$, are the functions of $\delta$ respectively, and includes the following parameters:

m=total mass of the members pivoting on the vertical pivot axis except the head slider;

$m_3$=mass of head slider 9;

$J_0$=inertia moment of total mass of the members pivoting on the vertical pivot axis except the head slider about the gravity center;

$k_1$, $k_2$ and $k_3$=spring constants of respective springs;

$l_1$ and $l_2$=distances between apex 61a of fulcrum 61 and acting points of respective springs; and $\alpha$=acceleration of the external impact Equation (8-1) can be expressed equation (9-1) as a function of $\delta$.

$$|x_3|_{max} = f(\delta) \quad (9\text{-}1)$$

As an example, the impact acceleration of the external impact is expressed by equation (9-2).

$$\alpha(t) = (1000 \cos(100\pi t)) g \quad (9\text{-}2)$$

FIG. 9 shows a simulation result of $(x_3)_{max}$ with respect to $\delta$ when impact acceleration $\alpha(t)$ is applied. At this simulation, the following design specifications of the respective structural elements are used.

$m \cdot g = 48 \text{ (mgf)} = 4.8 \times 10^{-6} \text{ (kgf)}$ $m_3 \cdot g = 0.6 \text{ (mgf)} = 6 \times 10^{-7} \text{ (kgf)}$ $J_0 = 0.85 \text{ (gfmm}^2\text{)} = 8.5 \times 10^{-10} \text{ (kgm}^2\text{)}$ $l_1 = 0.2 \text{ (mm)} = 2 \times 10^{-4} \text{ (m)}$ $l_2 = 11.8 \text{ (mm)} = 1.18 \times 10^{-2} \text{ (m)}$ $k_1 = 70.8 \text{ (gf/mm)} = 6.943 \times 10^2 \text{ (N/m)}$ $k_2 = 0.04 \text{ (gf/mm)} = 3.92 \times 10^{-1} \text{ (N/m)}$ $k_3 = 51000 \text{ (gf/mm)} = 5.0 \times 10^5 \text{ (N/m)}$ $\omega = 100\pi \text{ (rad/s)} = 3.14159 \times 10^2 \text{ (rad/s)}$ A pivot direction of beam 62 is determined by a force applying direction and gravity center position $\delta$ with respect to the vertical pivot axis (refer to FIGS. 7A, 7B, 8A, and 8B).

In FIG. 9, therefore, there exists a (+) pivot direction as well as a (−) pivot direction of beam 62 in both of the (+) region and the (−) region of gravity center position 5.

Based on this fact, assume that the positions of head slider 9 are $x_3^+$ and $x_3^-$ in the (+) region and the (−) region of gravity center position $\delta$, then curves of $(x_3^+)_{max}$ and $(x_3^-)_{max}$ exist in the respective regions, where $(x_3^+)_{max}$ and $(x_3^-)_{max}$ indicate the maximum values $(x_3)_{max}$ respectively when beam 62 pivots along the (+) direction and the (−) direction.

FIG. 9 tells that curve of $(x_3)_{max}$ with respect to gravity center $\delta$ generally forms the letter V. As gravity center position "A" becomes far away from apex 61a, moving amount $(x_3)_{max}$ of head slider 9 becomes greater.

A flying height between the ABS face of head slider 9 and the surface of disk 4 changes due to surface wobble of spinning disk 4, manufacturing dispersion, and ambient environment (e.g. atmospheric pressure). Disk 4 has a guaranteed flying height (referred to as a glide height) that defines the critical height. When head slider 9 floats over the critical height, no inconveniences such as a collision between head slider 9 and disk 4 occur.

Thus the flying height minus the foregoing change together with the glide height leaves the maximum allowable moving amount of $x_3$. Setting gravity center position $\delta$ of beam 62, such that moving amount $(x_3)_{max}$ of head slider 9 falls within the range not greater than maximum allowable moving amount $x_{os}$, allows eliminating, the inconvenience of head slider 9 touching disk 4 if the external impact is applied. This setting also can eliminate the inconvenience of inviting damage to head slider 9 and disk 4. In general, 20%×(flying height $x_0$−the glide height) is the allowable maximum moving amount $x_{os}$.

In FIG. 9, assume that the maximum moving amount $x_{os}$=2 (nm) that ensures no contact between head slider 9 and disk 4 with the surface wobble due to spin of disk 4 taken into consideration, and flying height $x_0$ is set at 9 (nm) between ABS face of head slider 9 and the surface of disk 4 during the normal operation of the disk device. Then a straight line expressed by equation (9-3) and curves $(x_3^+)_{max}$ and $(x_3^-)_{max}$ intersect with each other at points $M_{30}$, $N_+$, $M_-$, and $N_-$. Then numerical values of $\delta_1^+$, $\delta_2^+$, $\delta_1^-$, $\delta_2^-$ of coordinates $\delta$ at the foregoing intersection points can be found. Those numerical values are then a straight line expressed by equation (9-3) and curves $(x_3^+)_{max}$ and $(x_3^-)_{max}$ intersect with each other at points $M_+$, $N_+$, $M_-$, and $N_-$.

$$(x_3)_{max} = x_{0s} = 2 \text{ (nm)} \quad (9\text{-}3)$$

The numerical values of $\delta_1^+$, $\delta_2^+$, $\delta_1^-$, $\delta_2^-$ of coordinates $\delta$ at the foregoing intersection points are found as follows: $\delta_1^+ \approx 0.27$ (mm), $\delta_1^- \approx 0.26$ (mm), $\delta_1^- \approx -0.27$ (mm), $\delta_2^- \approx -0.26$ (mm). Those numerical values are the values when curves $(x_3^+)_{max}$ and $(x_3^-)_{max}$ intersect with each other at points $M_+$, $N_+$, $M_-$, and $N_-$, respectively.

On top of that, equations (9-4) and (9-5) are established.

$$\delta_1^+ \approx 0.27 \text{ (mm)} > \delta_1^- \approx 0.26 \text{ (mm)} \quad (9\text{-}4)$$

$$\delta_2^- \approx -0.26 \text{ (mm)} > \delta_2^+ \approx -0.27 \text{ (mm)} \quad (9\text{-}5)$$

When equations (9-4) and (9-5) are established, gravity center position "A" is placed within the region of gravity center position $\delta$ expressed by equations (9-6-1) and (9-6-2), where "A" is the gravity center position of the members pivoting on the vertical pivot axis except head slider 9.

$$\delta_1^- \approx 0.26 \text{ (mm)} > \delta > \delta_2^- \approx -0.26 \text{ (mm)} \quad (9\text{-}6\text{-}1)$$

$$\delta_2^- \approx -0.26 \text{ (mm)} < \delta < \delta_1^- \approx 0.26 \text{ (mm)} \quad (9\text{-}6\text{-}2)$$

Setting gravity center position δ within the region expressed by equations (9-6-1) and (9-6-2) allows acceleration α(t) to receive the impact expressed by equation (9-7).

$$\alpha(t)=\pm(1000\cos(100\pi t))g \tag{9-7}$$

However, even if the external impact expressed by equation (9-7) is applied, head slider 9 will not touch disk 4. To be more specific, allowable maximum impact acceleration α(t) is set, and the region of δ is found by using the foregoing design specifications of each element, and then gravity center position "A" of beam 62 is located within the region of δ. When an external impact with an impact acceleration not greater than allowable maximum impact acceleration α(t) is applied, this preparation allows regulating head slider 9 to move not greater than the maximum moving amount $x_{os}$. The inconvenience of the collision between head slider 9 and disk 4 can thus be eliminated, and the head support device that is excellent in great shock resistance is obtainable.

Next, a drop impact test is done on the head support device having the elements of which design specifications are discussed above. To be more specific, a critical impact acceleration is to be found, which acceleration does not invite damage to at least one of head slider 9 or disk 4 even if head slider 9 touches disk 4.

FIG. 10 shows the test result, in which an impact with its acceleration varying is caused to the head support device, of which gravity center position δ is varied, along the perpendicular direction with respect to disk 4. Gravity center position 8 is actually the gravity center position of the members pivoting on vertical pivot axis 31 except head slider 9. The maximum critical impact acceleration that does not invite any damage to at least one of head slider 9 or disk 4 is found.

The horizontal axis of FIG. 10 is the same one as in FIG. 9, and indicates the gravity center position of total mass of beam 62 with respect to apex 61a. The vertical axis indicates the maximum critical drop impact acceleration that does not invite any damage to at least one of disk 4 or head slider 9.

As FIG. 10 tells, curve 101 representing the maximum critical drop impact acceleration bows upward, and the gravity center position, at which the impact acceleration takes the maximum value, generally agrees with δ=0. This fact tells that a close agreement of gravity center position of total mass of only beam 62 with apex 61a allows for obtaining of the maximum critical impact acceleration, rather than a close agreement of the gravity center position of total mass (m+m$_3$) of the members pivoting on apex 61a. The head support device having such a structure can thus resist a greater drop impact. In other words, from the viewpoint of shock resistance, when the gravity center position of total mass of the members pivoting on apex 61a of fulcrum 61 is taken into consideration, it is reasonable to consider the mass of beam 62 independently of the mass of head slider 9. This can be estimated from the result shown in FIG. 10.

For the collision between head slider 9 and disk 4 not to invite any damage to at least one of head slider 9 or disk 4, gravity center position δ that always satisfies equation (10-1) derived from equation (9-1) should be found; where gravity center position "A" is the gravity center position of the members, other than the head slider, pivoting on the vertical pivot axis, δ is a distance between apex 61a and gravity center position "A", and $x_{os}$ is maximum moving amount.

$$|x_3|_{max}=f(\delta)<x_{0s} \tag{10-1}$$

First, find a straight line expressed by equation (11) before finding equation (10-1).

$$(x_3)_{max}=x_{0s} \tag{11}$$

Then find an intersection point between equations (11) and (9-1), namely, solve equation (11-1) with respect to gravity center position δ.

$$|x_3|_{max}=f(\delta) \tag{11-1}$$

As discussed above, equation (11-1) has four solutions, i.e. $\delta_1^+$, $\delta_2^+$, $\delta_1^-$, $\delta_2^-$, and these four solutions are defined as follows:

$\delta_1^+$: gravity center position when beam 62 pivots along (+) direction, and δ takes (+) value;

$\delta_2^+$: gravity center position when beam 62 pivots along (+) direction, and δ takes (−) value;

$\delta_1^-$: gravity center position when beam 62 pivots along (−) direction, and δ takes (+) value; and $\delta_2^-$: gravity center position when beam 62 pivots along (−) direction, and δ takes (−) value.

The respective solutions $\delta_1^+$, $\delta_2^+$, $\delta_1^-$, and $\delta_2^-$ are expressed by equations (12-1), (12-2), (12-3) and (12-4).

$$f(\delta_1^+)=x_{0s} \tag{12-1}$$

$$f(\delta_2^+)=x_{0s} \tag{12-2}$$

$$f(\delta_1^-)=x_{0s} \tag{12-3}$$

$$f(\delta_1^+)=x_{0s} \tag{12-4}$$

Next, determine the region of gravity center position δ that always satisfies equation (10-1). In the case of δ in the positive (+) region, smaller solution between $\delta_1^+$ and $\delta_1^-$ of equation (11-1) is referred to as $\delta_1$. In the case of δ in the negative (−) region, the greater solution between $\delta_2^+$ and $\delta_2^-$ of equation (11-1) is referred to as $\delta_2$. In other words, a smaller one between $\delta_1^+$ and $\delta_1^-$ is referred to as min($\delta_1^+$, $\delta_1^-$), and a greater one between $\delta_2^+$ and $\delta_2^-$ is referred to as max($\delta_2^+$, $\delta_2^-$). Then gravity center position δ is set to satisfy equation (13). Meanwhile gravity center positions δ1 and δ2 are expressed by equations (13-1) and (13-2) respectively.

$$\delta_2<\delta<\delta_1 \tag{13}$$

$$\delta_1=\min(\delta_1^+,\delta_1^-) \tag{13-1}$$

$$\delta_2=\max(\delta_1^+,\delta_1^-) \tag{13-2}$$

Satisfaction of equation (13) allows for preventing of the inconvenience of a collision of head slider 9 with disk 4 when the external impact having the impact acceleration not greater than the maximum allowable impact acceleration α(t) is applied to the head support device. It can thus be concluded that the inconvenience that invites damage to head slider 9 and disk 4 can be prevented.

In other words, in head support device 7 shown in FIGS. 2 and 3, the gravity center position of the total mass of the members, other than the head slider 9, pivoting on vertical pivot axis 31 is positioned in the vicinity of vertical pivot axis 31, namely in the region of δ in equation (13). In this context, the members of total mass other than head slider 9 include head support arm 8, voice coil section 24, the section touching head support arm 8 and belonging to leaf spring 25, gimbal mechanism 21 and balancer 23. Vertical pivot axis 31 is actually formed of a straight line drawn between contact points P$_1$ and P$_2$ which are the contact points of the pair of pivots 27a and 27b provided to pivot bearing 27 to the top face of head support arm 8.

The foregoing structure suppresses a pivot amount of head support arm 8 to as little as possible caused by the external impact, so that extraordinary reduction in the load applied to head slider 9 can be avoided. Head slider 9 can thus obtain stable floating balance, and can be prevented from touching and damaging disk 4. The head support device that is excellent in great shock resistance is thus obtainable.

Gravity center positions $\delta_1$, $\delta_2$ can be found by calculations as discussed above; however, an actual external impact comes with a waveform not so simple as expressed by equation (5). The motions of beam 62 and head slider 9 are actually attenuated by friction or the like, so that it is preferable to find gravity center positions $\delta_1$, $\delta_2$ in an experimental manner as shown in FIG. 10.

When the gravity center position of the members pivoting on vertical pivot axis 31 other than head slider 9 is positioned such that it satisfies equation (13) with respect to axis 31, the gravity center position of the members pivoting on axis 31 including head slider 9 is positioned in region $\epsilon$ expressed by equation (14) with respect to axis 31.

$$\varepsilon_2 = \frac{m_3 l_2 + m\sigma_2}{m + m_3} < \varepsilon < \varepsilon_1 \qquad (14)$$
$$= \frac{m_3 l_2 + m\sigma_1}{m + m_3}$$

In this first embodiment, the apexes of the pair of pivots 27a and 27b provided to pivot bearing 27 touch the top face of head support arm 8; however, the present invention is not limited to this instance. For example, as shown in FIG. 11, the apexes of pivots 111a and 111b provided at head support arm 111 can touch an underside of flange 112a of bearing section 112. Pivots 111a and 111b touch the underside of flange 112a at contact points $Q_1$ and $Q_2$, which are placed symmetrical with respect to the axial line of rotary shaft 5 (not shown). On top of that, the straight line between contact points $Q_1$ and $Q_2$, namely, the vertical pivot axis, runs through the rotary shaft 5 and is perpendicular with respect to the longitudinal centerline of head support arm 111, and yet, the midpoint of the straight line between contact points $Q_1$ and $Q_2$ generally agrees with the axial line of rotary shaft 5.

Since this first embodiment proves that the head support arm of the head support device can be formed of highly rigid material, the head support arm can improve its shock resistance against a large external impact. The resonance frequency of the head support arm also can be increased, which allows for eliminating of a conventionally troublesome vibration mode, so that a settling action is not needed anymore. As a result, the head support device can be rotated and positioned at a higher speed.

The leaf spring, a kind of the elastic mechanism, is prepared independently of the head support arm, so that the load to be applied to the head slider can be adjusted at a predetermined value with ease, thereby increasing flexibility in design.

The head support arm can pivot about the straight line (vertical pivot axis) between contact points $P_1$ and $P_2$ which are the contact points of a pair of pivots of the pivot bearing to the top face of the head support arm.

The gravity center position of the members pivoting about the vertical pivot axis other than the head slider is positioned at the vicinity of the vertical pivot axis. The foregoing members include the head support arm, the voice coil section, the section touching the head support arm and belonging to the leaf spring, the gimbal mechanism, and the balancer. This structure prevents the inconvenience, i.e. the head slider touches and damages the surface of the disk even if the large external impact is applied to the head slider. As a result, the head support device that is highly excellent in shock resistance is obtainable.

Use of the foregoing head support device in a magnetic disk device allows the magnetic disk device to have excellent shock resistance and access speed.

Exemplary Embodiment 2

Figure 12:
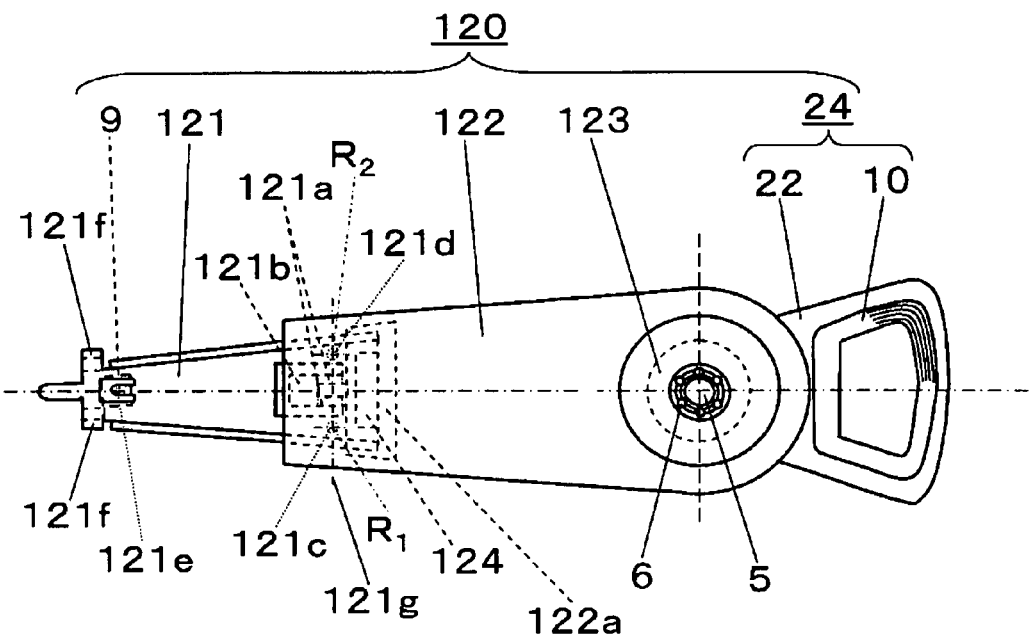
FIG. 12 shows a plan view illustrating a head support device in accordance with a second embodiment of the present invention.
Figure 13:
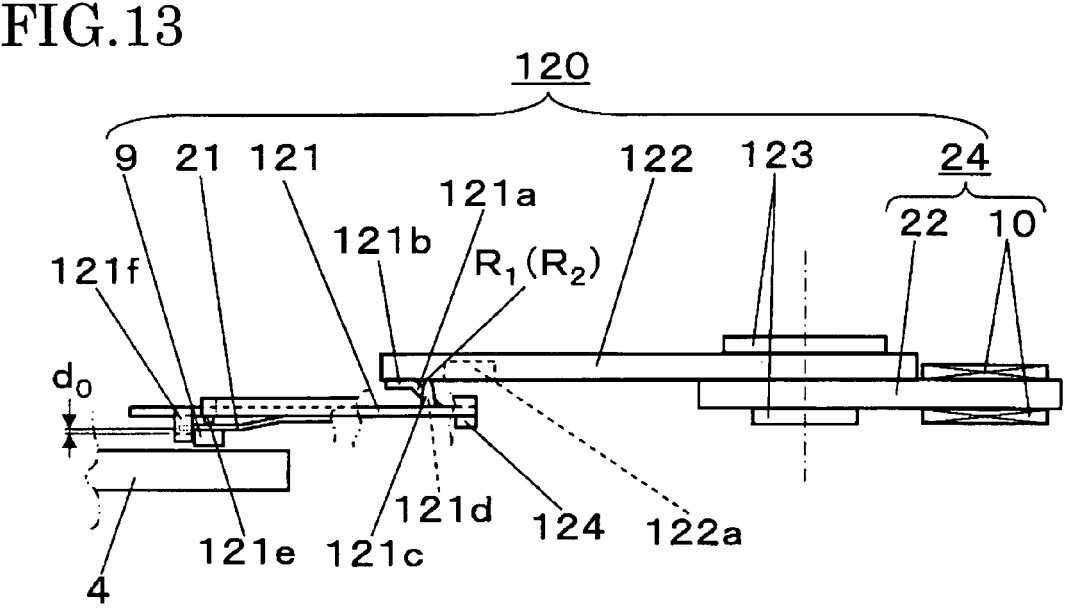
FIG. 13 shows a lateral view illustrating a structure of the head support device in accordance with the second embodiment of the present invention.
Figure 14:
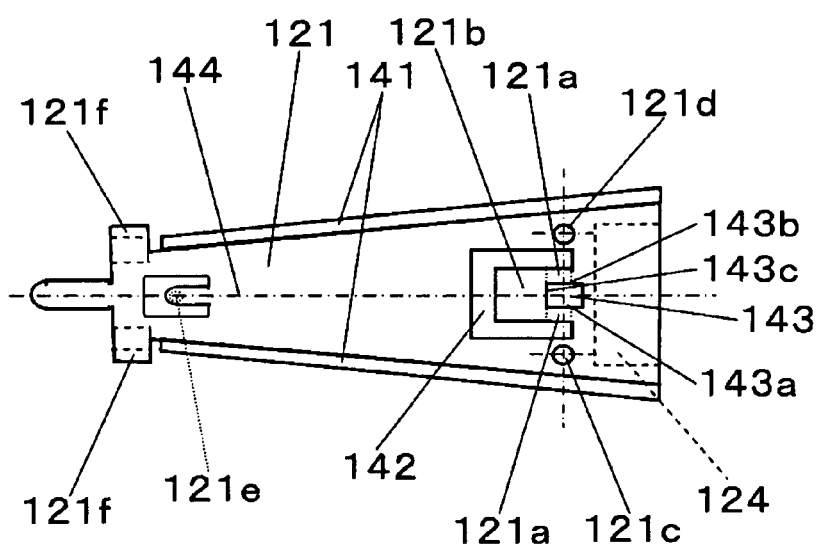
FIG. 14 shows a plan view of a head support arm in accordance with the second embodiment of the present invention.

FIGS. 12-14 illustrate a head support device in accordance with a second embodiment of the present invention. FIG. 12 shows a plan view illustrating a structure of the head support device. FIG. 13 shows a lateral view illustrating the structure of the head support device. FIG. 14 shows a plan view of a head support arm of the head support device. In FIGS. 12 and 13, similar elements to those used in FIGS. 2 and 3 of the first embodiment have the same reference marks.

Head support device 120 in accordance with the second embodiment is formed of head support arm 121 having head slider 9 at its first end via gimbal mechanism 21, and a magnetic head (not shown) mounted to head slider 9, and leaf spring 121a provided to arm 121. Leaf spring 121a is coupled to fixer 121b fixed to head rotating arm 122.

The apexes of a pair of pivots 121c and 121d provided to head support arm 121 touch an underside (facing disk 4) of head rotating arm 122, which is elastically coupled to head support arm 121 via the pair of pivots 121c, 121d and leaf spring 121a, a kind of the elastic mechanism. Head rotating arm 122 has bearing section 123 at a side opposite to head support arm 121, and bearing 6 is built in bearing section 123. Head rotating arm 122 can be integrated with bearing section 123 into one unit.

Voice coil section 24, formed of voice coil 10 mounted to voice coil holder 22, is fixed to head rotating arm 122 at the side opposite to head support arm 121 with respect to bearing section 123 fixed to arm 122. Head support arm 121 having head slider 9 via gimbal mechanism 21 and voice coil section 24 are provided to head rotating arm 122, to which bearing section 123 is fixed. Head support device 120 is thus constructed. Head support device 120 is supported by rotary shaft 5 via bearing 6, so that device 120 can rotate on shaft 5 horizontally.

The second embodiment employs a similar structure to that used in the first embodiment, namely, the head support device can rotate on rotary shaft 5 horizontally and generally in parallel with the surface of disk 4. Supply of electric current to voice coil 10 energizes VCM (voice coil motor), so that head support device 120 rotates along the radial direction of disk 4. Head rotating arm 122 can be independent of voice coil section 24, or they can be integrated into one unit.

Head support arm 121 is demonstrated with reference to FIG. 14. Head support arm 121 is formed by processing a non-magnetic thin metal sheet with a known technique such as press working or etching, and its surface looks like an isosceles triangle. On both the sides along the longitudinal direction, i.e. on both slopes of the isosceles triangle, bent sections 141 are formed, thereby increasing the rigidity along the longitudinal direction of head support arm 121. Slit 142 shaped like a letter "U" is formed at the center between bent sections 141 formed on both sides. Substantially rectangular cutout section 143 is formed in a tongue-shaped tab prepared within slit 142, and the section between both the lateral faces 143a and 143b of cutout section 143 and slit 142 form leaf spring 121a, The section between lateral face 143c sandwiched by both lateral faces 143a and 143b of cutout section 143 and slit 142 forms fixer 121b to be fixed to head rotating arm 122. On head support arm 121, pivots 121c and 121d are formed such that they are placed symmetrically with respect to longitudinal centerline 144 and outside of the lateral faces of slit 142 confronting lateral faces 143a and 143b of cutout section 143. Pivots 121c and 121d are protruded to the other side of head slider 9 mounted via gimbal mechanism 21 (not shown in FIG. 14).

In the second embodiment, bulge 121e is provided on an underside of head support arm 121 such that bulge 121e touches the vicinity of a center of head slider 9. This is the same structure as that of the first embodiment. When head slider 9 is mounted to arm 121 via gimbal mechanism 21, bulge 121e is brought into contact with gimbal mechanism 21 or generally at the center of the top face (the other side of the head-mounted side) of head slider 9.

The foregoing structure allows head slider 9 to follow flexibly the unnecessary vibrations of disk 4 along a pitching or a rolling direction. Limiter 121f is provided to head support arm 121 such that clearance "$d_0$" is secured between limiter 121f and gimbal mechanism 21, to which head slider is fixed (refer to FIG. 5 used in the first embodiment). When gimbal mechanism 21 is apart from bulge 121e by a given distance, limiter 121f touches gimbal mechanism 21 for regulating the distance spaced between dimple 121e and gimbal mechanism 21. This is the same structure as the first embodiment.

The mass (weight) of balancer 124 is adjusted such that the gravity center position of the total mass of gimbal mechanism 21, balancer 124, and head support arm 121 other than leaf spring 121a and fixer 121b is positioned at a given place, and such balancer 124 is fixed to an end of head support arm 121. In FIGS. 12-14, balancer 124 is fixed to head support arm 121 at the head slider 9 side; however the present invention is not limited to this instance. Balancer 124 can be fixed at any position of head support arm 121 so that the gravity center position of the total mass can be positioned at the given place.

As shown in FIG. 13, fixer 121b of head support arm 121 is fixed to an end of head rotating arm 122 so that the apexes of the pair of pivots 121c and 121d can touch the underside of head rotating arm 122. Head support arm 121 is thus coupled elastically to head rotating arm 122 by leaf spring 121a, which is a kind of the elastic mechanism, via the pair of pivots 121c, 121d and leaf spring 121a.

Head support arm 121 can pivot about the straight line between contact points $R_1$ and $R_2$ which are the contact points of the pair of pivots 121c and 121d to the underside of head rotating arm 122. In other words, head support arm 121 can pivot vertically with respect to the surface of disk 4 on vertical pivot axis 121g (refer to FIG. 12) drawn between contact points $R_1$ and $R_2$. This is the same structure as the first embodiment.

Leaf spring 121a pivots head support arm 121 by using the straight line drawn between contact points $R_1$ and $R_2$ as a fulcrum such that the slider-mounted side of head support arm 121 is urged downward (toward disk 4) by the elastic force of leaf spring 121a. This mechanism is also the same as the first embodiment.

Leaf spring 121a of head support arm 121 urges the slider-mounted side of head support arm 121 downward, at this time, an end of the other side of the slider-mounted side touches the underside of head rotating arm 122 for preventing head rotating arm 122 from interfering with the vertical pivot of head support arm 121. For this purpose, recess 122a is formed on the underside of head rotating arm 122 at a region covering the end of head support arm 121. The form of recess 122a is not necessarily limited to this one, but it can be a through hole.

In this second embodiment, head slider 9 mounted to head support arm 121 via gimbal mechanism 21 can float over the surface of disk 4 during the operation of the magnetic disk device. This is the same structure as the first embodiment. The load applied to head slider 9 at this time is generated by the compressive stress toward disk 4 as reaction force due to deformation of leaf spring 121a with respect to arm 121 by contact points $R_1$ and $R_2$ of the pair of pivots 121c and 121d. Head slider 9 floats depending on the relation between the urging force applied to head slider 9 toward disk 4 and the floating force applied along the opposite direction to the urging force. A given space between disk 4 and head slider 9, i.e. the magnetic head, is maintained for the magnetic disk device to read or write data.

The foregoing structure of head support device 120 allows for generating of the load to be applied to head slider 9 toward disk 4 in the following manner: the load is generated by the compressive stress toward disk 4 as reaction force due to deformation of leaf spring 121a with respect to head support arm 121 by contact points $R_1$ and $R_2$ of the pair of pivots 121c and 121d. The load can be set at a given value by using the projection height of the pair of pivots 121c, 121d and the elastic coefficient of leaf spring 121a.

Head rotating arm 122 is coupled to head support arm 121 at its end nearer to head slider 9 with leaf spring 121a, and the pair of pivots 121c, 121d touch head rotating arm 122, so that head support arm 121, to which head slider 9 is fixed via gimbal mechanism 21, pivots vertically (generally perpendicularly) with respect to the surface of disk 4. This structure allows for reducing of the total mass of head support arm 121, gimbal mechanism 21, head slider 9 and balancer 124 setting to position the total gravity center position.

This structure allows substantial reduction of an impact applied to head support arm 121 when an impact that is perpendicular with respect to the surface of disk 4 is applied to the disk device. On top of that, the pivot moment that will pivot head support arm 121 can be reduced by the following two methods together: (a) reducing the total mass of head support arm 121, gimbal mechanism 21 and balancer 24, and (b) positioning the gravity center position of the foregoing total mass substantially on vertical pivot axis 121g (the straight line drawn between respective contact points $R_1$, $R_2$ which are contact points between the pair of pivots 121c, 121d and head rotating arm 122). The foregoing structure can also greatly improve the shock resistance of head support device 120 against the impact applied perpendicularly with respect to the surface of disk 4.

When the impact that is perpendicular with respect to the surface of disk 4 is applied to foregoing head support device 120, the pivot-moment works, which moment is related to the distance between vertical pivot axis 121g and the gravity center position of the total mass of the sections held by leaf spring 121a except head slider 9, to be more specific, the sections including head support arm 121 minus leaf spring 121a and fixer 121b, gimbal mechanism 21, and balancer 124. When head support arm 121 is going to start pivoting about vertical pivot axis 121g, this motion of head support arm 121 changes the load produced by leaf spring 121a provided to head support arm 121; on the other hand, a negative pressure and a positive pressure both produced by spin of disk 4 are applied to head slider 9. As a result, the motion of head support arm 121 does not always agree with the motion of head slider 9 coupled to head support arm 121 via ultra-flexible gimbal mechanism 21.

Since head slider 9 floats over disk 4 due to the balancing relation between the load and the floating force, serious breakage in the balancing relation makes the floating unstable. If head slider 9 receives an external impact strong enough to cancel the load, head slider 9 floats in response to only the floating force, so that the balancing relation becomes seriously unstable. When a change in the load due to external force can be regulated, head slider 9 can float steadily. This theory is the same as that described in the first embodiment.

The discussion based on FIGS. 6-8 in accordance with the first embodiment is also applicable to head support arm 121 in accordance with the second embodiment, where the sections held by leaf spring 121a excludes head slider 9, but includes head support arm 121 except leaf spring 121a and fixer 121b, gimbal mechanism 21, and balancer 124, and they correspond to beam 62 discussed in the first embodiment.

The mass "m" of the present members corresponding to beam 62 of the first embodiment indicates the total mass of the sections held by leaf spring 121a other than head slider 9, to be more specific, head support arm 121 except leaf spring 121a and fixer 121b, gimbal mechanism 21, and balancer 124. In other words, the motion equation of the sections held by leaf spring 121a except head slider 9, and the motion equation of head slider 9 can be expressed by the same equations used in the first embodiment, namely, expressed by equations (3) and (4), and other reference marks used in the first embodiment can be used here.

Equation (13) used in the first embodiment can thus be established here, so that the gravity center position of the total mass of the sections held by leaf spring 121a except head slider 9 is positioned in the region of δ expressed by equation (13) with respect to the foregoing vertical pivot axis 121g, i.e. the straight line drawn between contact points $R_1$ and $R_2$ of pivots 121c and 121d of arm 121 to the underside of head rotating arm 122. This structure prevents the inconvenience that head slider 9 touches and damages disk 4 if the external impact is applied to the head support device. As a result, the head support device that is highly excellent in shock resistance is obtainable.

In the second embodiment, the pair of pivots 121c and 121d is provided to head support arm 121, and the apexes of the pivots touch the underside of head rotating arm 122. However, the present invention is not limited to this instance, for example, although this structure is not illustrated in the drawings, a pair of pivots can be provided to head rotating arm 122, and the apexes of the pivots touch a top face of head support arm 121.

In the second embodiment, leaf spring 121a is formed unitarily with head support arm 121; however, as demonstrated in the first embodiment, leaf spring 121a can be formed of a member independent of head support arm 121. A separate structure of leaf spring 121a from head support arm 121 allows for forming of head support arm 121 of rigid material, and forming of leaf spring 121a of flexible and elastic material, thereby greatly increasing the design flexibility.

In the first and second embodiments, the head support device used in the magnetic disk device employing magnetic heads is demonstrated; however, the head support device of the present invention is applicable to a non-contact type disk device, such as an optical disk device or a magneto optical disk device with similar advantages to what was discussed previously.

The second embodiment can thus reduce the weight of the head support arm, one of the elements of the head support device, and form it of rigid material to boost its rigidity. The second embodiment thus improves the shock resistance against the large external impact, and allows rotating and positioning the head support device to a desired track at a high speed. These advantages are similar to what is discussed in the first embodiment.

On top of that, the second embodiment allows the head support arm to pivot about the straight line (vertical pivot axis) drawn between contact points $R_1$ and $R_2$ of the pair of pivots formed on the head support arm to the underside of the head rotating arm. The gravity center position of the total mass of the members held by leaf spring 121a, which is an elastic mechanism, and pivoting about the vertical pivot axis except head slider 9 is positioned at the vicinity of the vertical pivot axis. This structure allows eliminating the inconvenience of a collision between the head slider and the disk or damage to the surface of the disk if the large external impact is applied to the head support device. The head support device that has excellent shock resistance is thus obtainable.

As it is described in the first embodiment, use of the foregoing head support device in a magnetic disk device allows for the magnetic disk device to have excellent shock resistance and access speed.

Exemplary Embodiment 3

Figure 15:
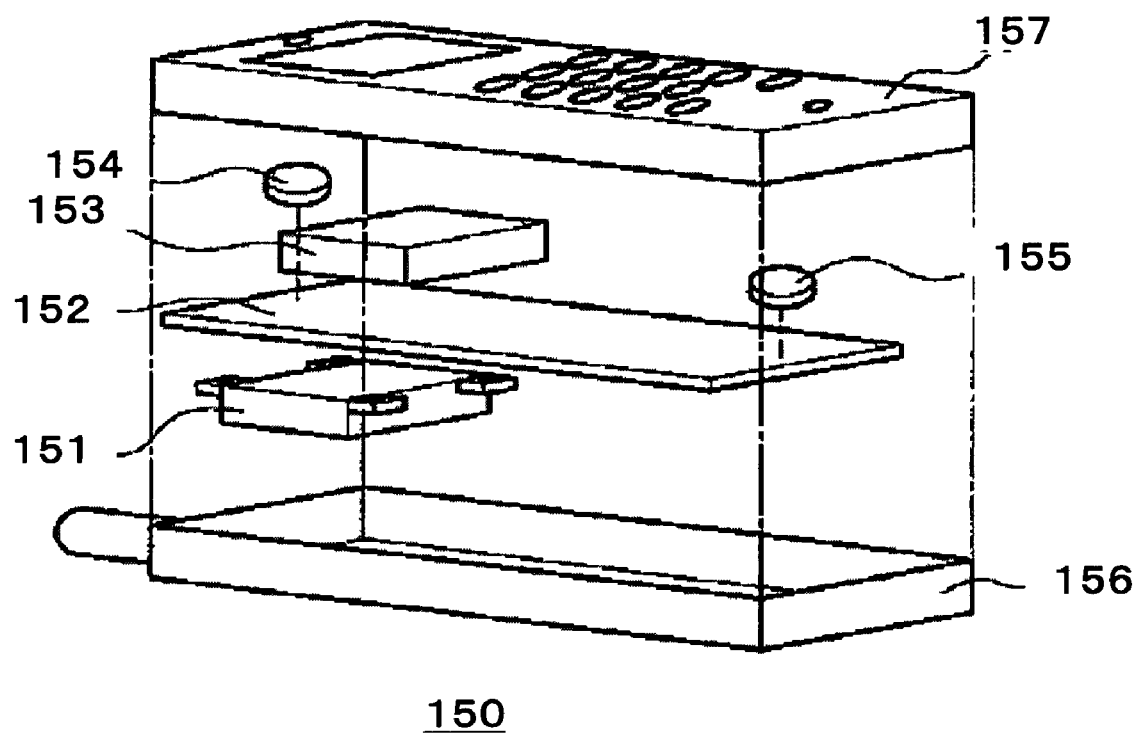
FIG. 15 shows a schematic diagram of a portable phone in accordance with a third embodiment of the present invention.
Figure 16:
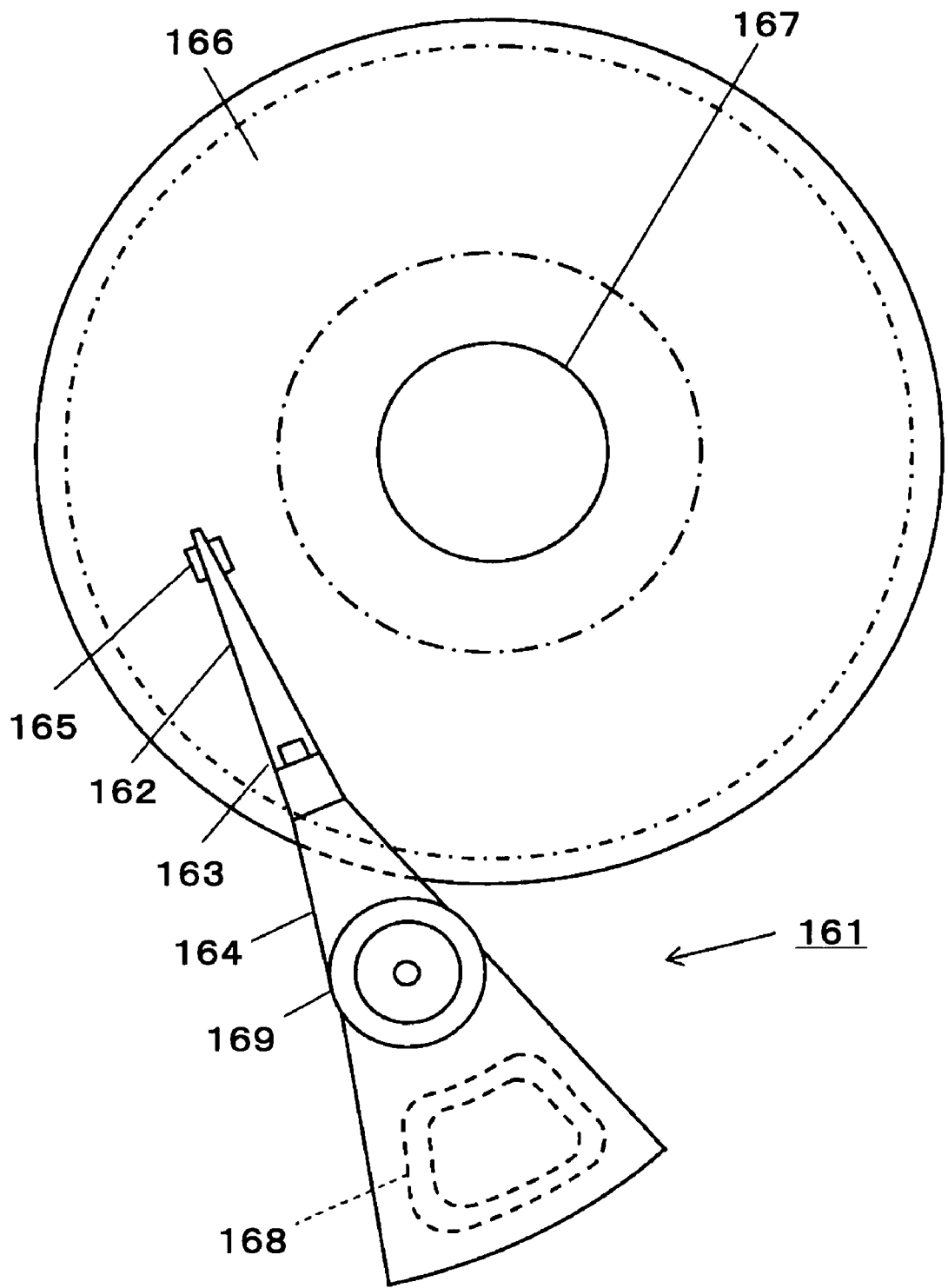
FIG. 16 shows a plan view illustrating an essential part of a structure of a conventional magnetic disk device.
Figure 17:
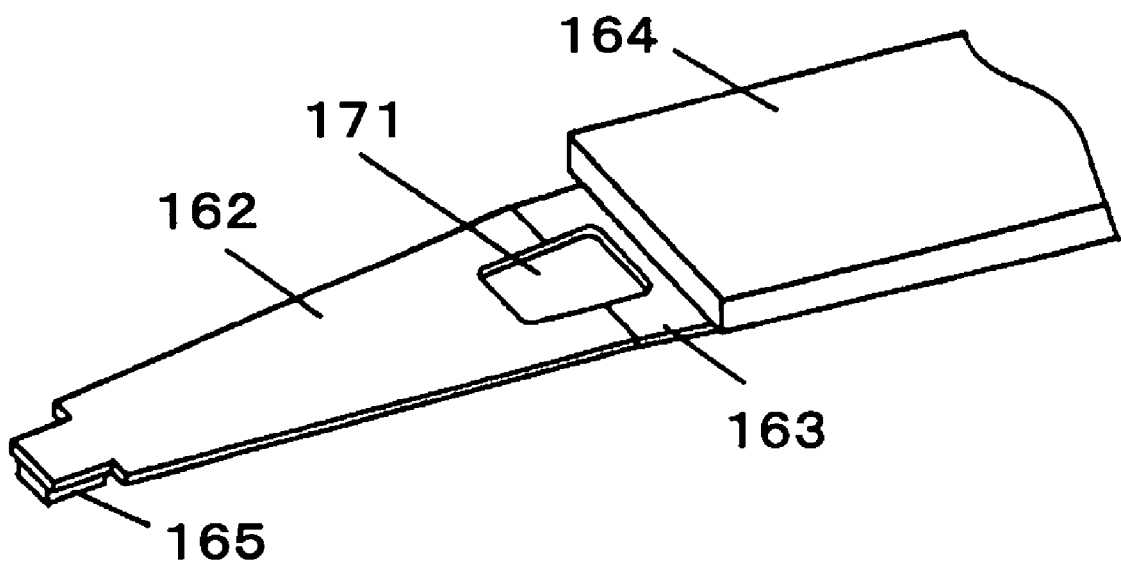
FIG. 17 shows an essential part of perspective view illustrating the operation of a conventional head support device.

An electronic device in accordance with a third embodiment of the present invention is demonstrated hereinafter, by taking a portable phone as an example, with reference to FIG. 15. In FIG. 15, portable phone 150 includes magnetic disk device 151 on an underside of substrate 152, and liquid crystal display 153, speaker 154 and microphone 155 are placed on a top face of substrate 152. Substrate 152 is accommodated in a housing formed of lower case 156 and upper case 157. Portable phone 150 is constructed as discussed above.

Magnetic disk device 151 includes the head support device demonstrated in the first and second embodiments, so that detailed description thereof is omitted here. Since disk device 151 is highly shock resistant as explained in the first embodiment, disk device 151 needs no cushion when it is mounted to portable phone 150, so that the portable phone can be downsized. Use of the head support device of the present invention together with a cushion allows for further strong shock resistance.

In the third embodiment, the magnetic disk is placed on the other side of liquid crystal display 153 with respect to substrate 152; however, the location of disk device 151 is not limited to this instance, and it can be located at any position with its strong shock resistance maintained.

In the third embodiment, the portable phone is taken as an example of the portable electronic device; however, the present invention is not limited to this instance, e.g. the present invention is applicable to portable information terminals such as a notebook size personal computer, a PDA, a movie-camera, a photo-camera, or a music player which store videos or music and need a large memory capacity. The head support device of the present invention can provide these portable devices or terminals with strong shock resistance.

The present invention discloses a head support device that allows a head support arm, having a head slider to which a head is mounted, to rotate on a horizontal rotary shaft and in parallel with the surface of a recording disk, and yet, allows the head support arm, to which the head slider is coupled via an ultra-flexible gimbal mechanism, to pivot about a vertical pivot axis which is formed of a straight line drawn between the apexes of a pair of pivots. The head support arm pivots vertically (generally perpendicularly) with respect to the surface of the disk. The head support device includes a leaf spring, an elastic mechanism, which generates urging force applying load to the head slider.

The head support device thus constructed allows the head support arm to be formed highly rigid, thereby improving shock resistance against a large external impact. At the same time, a resonance frequency of the head support arm can be increased, so that the head support device can be rotated and positioned to a desired track advantageously at a higher speed.

On top of that, a gravity center position of the total mass of members, other than the head slider, pivoting about the vertical pivot axis is located at the vicinity of the vertical pivot axis. This structure invites no collision between the head slider and the disk or no damage on the surface of the disk if an external impact applied to the head support device perpendicularly with respect to the disk surface, so that the head support device has excellent shock resistance.

The present invention is thus useful for the head support devices to be used in magnetic disk devices and non-contact type disk devices such as optical disk devices, and magneto optical disk devices.

Use of the magnetic disk device, or non-contact type disk device, such as an optical disk device or a magneto optical disk device employing the head support device of the present invention, in portable electronic devices, equips those portable electronic devices with strong shock resistance. The present invention thus has such high industrial applicability.

The invention claimed is:

1. A head support device comprising:
   a head slider having a signal transducer;
   a head support arm having first end coupled to the head slider;
   a voice coil coupled to a second end opposite to the first end of the head support arm with respect to a horizontal rotary shaft, which rotates the head support arm in parallel with a recording disk surface;
   a pair of pivots forming a vertical pivot axis about which the head support arm pivots vertically with respect to the disk surface; and
   an elastic mechanism for generating load which urges the head slider toward the disk surface about the vertical pivot axis as a center,
   wherein a gravity center position of a total mass of members, other than the head slider, that pivot about the vertical pivot axis substantially agrees with a position of the vertical pivot axis,
   wherein gravity center position $\delta$ is placed in a region defined as and formed of the head support arm as a coordinate axis, the vertical pivot axis as an origin, the head slider side as a positive region, and the other side of the head slider side as a negative region,
   wherein a moving amount of the head slider upon receiving an allowable maximum impact acceleration along a direction perpendicular with respect to the disk for pivoting the head support arm to approach the disk is $\delta_1^+$ upon the gravity center position $\delta$ of the members, other than the head slider, pivoting about the vertical pivot axis being in the positive region and a clearance between the disk surface and the head slider being an allowable maximum moving amount, and the moving amount is $\delta_2^+$ upon the gravity center position $\delta$ being in the negative region,
   wherein a moving amount of the head slider upon receiving the allowable maximum impact acceleration along a direction perpendicular with respect to the disk for pivoting the head support arm to move away from the disk is $\delta_2^-$ upon the gravity center position $\delta$ of the members, other than the head slider, pivoting about the vertical pivot axis being in the negative region and the clearance between the disk surface and the head slider being the allowable maximum moving amount, and the moving amount is $\delta_1^-$ upon the gravity center position $\delta$ being in the positive region, and
   wherein assuming that a smaller one between $\delta_1^+$ and $\delta_1^-$ is $\delta_1$, and a greater one between $\delta_2^+$ and $\delta_2^-$ is $\delta_2$, then a region where gravity center position $\delta$ of the total mass agrees with the position of the vertical pivot axis satisfies equation (1) with respect to the vertical pivot axis $$\delta_2 < \delta < \delta_1 \tag{1}.$$

2. The head support device of claim 1,
   wherein the gravity center position substantially agrees with an intersection point between a longitudinal centerline of the head support arm and the vertical pivot axis.

3. A disk device comprising:
   a recording disk spun by a spindle motor; and
   a head support device with a signal transducer confronting the disk for recording a signal onto the disk or reproducing a signal from the disk,
   wherein the head support device is defined in claim 1.

4. A portable electronic device including a disk device comprising:
   a recording disk spun by a spindle motor; and
   a head support device with a signal transducer confronting the disk for recording a signal onto the disk or reproducing a signal from the disk,
   wherein the head support device is defined in claim 1.

5. A head support device comprising:
   a head slider having a signal transducer;
   a head support arm having first end coupled to the head slider;
   a voice coil coupled to a second end opposite to the first end of the head support arm with respect to a horizontal rotary shaft, which rotates the head support arm in parallel with a recording disk surface;
   a pair of pivots forming a vertical pivot axis about which the head support arm pivots vertically with respect to the disk surface; and
   an elastic mechanism for generating load which urges the head slider toward the disk surface about the vertical pivot axis as a center,
   wherein a gravity center position of a total mass of members, other than the head slider, that pivot about the vertical pivot axis substantially agrees with a position of the vertical pivot axis,
   wherein gravity center position $\delta$ is placed in a region defined as and formed of the head support arm as a coordinate axis, the vertical pivot axis as an origin, the head slider side as a positive region, and the other side of the head slider side as a negative region,
   wherein a moving amount of the head slider upon receiving an allowable maximum impact acceleration along a direction perpendicular with respect to the disk for pivoting the head support arm to approach the disk is $\delta_1^+$ upon the gravity center position $\delta$ of the members, other than the head slider, pivoting about the vertical pivot axis being in the positive region and a clearance between the disk surface and the head slider being an allowable maximum moving amount, and the moving amount is $\delta_2^+$ upon the gravity center position $\delta$ being in the negative region,
   wherein a moving amount of the head slider upon receiving the allowable maximum impact acceleration along a direction perpendicular with respect to the disk for pivoting the head support arm to move away from the disk is $\delta_2^-$ upon the gravity center position $\delta$ of the members, other than the head slider, pivoting about the vertical pivot axis being in the negative region and the clearance between the disk surface and the head slider being the allowable maximum moving amount, and the moving amount is $\delta_1^-$ upon the gravity center position $\delta$ being in the positive region, and
   wherein assuming that a smaller one between $\delta_1^+$ and $\delta_1^-$ is $\delta_1$, and a greater one between $\delta_2^+$ and $\delta_2^-$ is $\delta_2$, a total mass of the members, other than the head slider, pivoting about the vertical pivot axis is "m", a mass of the head slider is "$m_3$", a longitudinal distance along the head support arm from the vertical pivot axis to a center of the head slider is "$l_2$", then gravity center position "$\epsilon$" of the members, including the head slider pivoting about the vertical pivot axis is in a region satisfying equation (2) with respect to the vertical pivot axis.

$$\begin{aligned} \varepsilon_2 &= \frac{m_3 l_2 + m\delta_2}{m+m_3} < \varepsilon < \varepsilon_1 \\ &= \frac{m_3 l_2 + m\delta_1}{m+m_3} \end{aligned} \quad (2)$$

6. The head support device of claim 5, wherein the gravity center position substantially agrees with an intersection point between a longitudinal centerline of the head support arm and the vertical pivot axis.

7. A disk device comprising:
a recording disk spun by a spindle motor; and
a head support device with a signal transducer confronting the disk for recording a signal onto the disk or reproducing a signal from the disk,
wherein the head support device is defined in claim 5.

8. A portable electronic device including a disk device comprising:
a recording disk spun by a spindle motor; and
a head support device with a signal transducer confronting the disk for recording a signal onto the disk or reproducing a signal from the disk,
wherein the head support device is defined in claim 5.

* * * * *